(12) United States Patent
Kutchko et al.

(10) Patent No.: US 12,226,983 B2
(45) Date of Patent: Feb. 18, 2025

(54) MULTILAYER SYSTEMS AND METHODS OF MAKING MULTILAYER SYSTEMS

(71) Applicant: PPG Industries Ohio, Inc., Cleveland, OH (US)

(72) Inventors: Cynthia Kutchko, Pittsburgh, PA (US); Michael A. Bubas, Pittsburgh, PA (US); Bryan W. Wilkinson, Pittsburgh, PA (US); Eric S. Epstein, Pittsburgh, PA (US); Weibin Cui, Rancho Palos Verdes, CA (US); Renhe Lin, Stevenson Ranch, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 499 days.

(21) Appl. No.: 17/430,057

(22) PCT Filed: Feb. 10, 2020

(86) PCT No.: PCT/US2020/017428
§ 371 (c)(1),
(2) Date: Aug. 11, 2021

(87) PCT Pub. No.: WO2020/167626
PCT Pub. Date: Aug. 20, 2020

(65) Prior Publication Data
US 2022/0134723 A1    May 5, 2022

Related U.S. Application Data

(60) Provisional application No. 62/803,727, filed on Feb. 11, 2019.

(51) Int. Cl.
*B32B 37/15* (2006.01)
*B29C 48/21* (2019.01)
(Continued)

(52) U.S. Cl.
CPC ........... *B32B 27/286* (2013.01); *B29C 48/21* (2019.02); *B32B 27/285* (2013.01); *B32B 27/38* (2013.01);
(Continued)

(58) Field of Classification Search
CPC .......... B32B 37/153; B32B 2307/3065; B32B 2307/536; B32B 2307/732;
(Continued)

(56) References Cited

U.S. PATENT DOCUMENTS 3,517,082 A    6/1970   Cockerham
3,563,957 A    2/1971   Beebe
(Continued)

FOREIGN PATENT DOCUMENTS

CA    2378348 A1    2/2001
CA    2950215 A1    12/2015
(Continued)

OTHER PUBLICATIONS

Universal Selector by SpecialChem, Desmophen® 550 U Technical Data Sheet—Supplied by Covestro, Mar. 4, 2021, 2 pages, http://coatings.specialchem.com.
(Continued)

*Primary Examiner* — Robert B Davis

(57) ABSTRACT

Methods of making multilayer systems comprising a sealant layer by extruding a coreactive sealant composition are disclosed. The methods can be used to fabricate multilayer systems in which individual layers have different cured properties. Individual layers can also have an inhomogeneous concentration of one or more constituents within a layer. The multilayer systems can be made using three-dimensional printing that facilitate the use of a wide range of coreactive compositions.

12 Claims, 3 Drawing Sheets

(51) Int. Cl.
  *B32B 27/28* (2006.01)
  *B32B 27/38* (2006.01)
  *B29K 101/10* (2006.01)
  *B29K 105/00* (2006.01)
  *B29K 105/16* (2006.01)
  *B29L 9/00* (2006.01)
  *B29L 31/30* (2006.01)

(52) U.S. Cl.
  CPC ........ *B32B 37/153* (2013.01); *B29K 2101/10* (2013.01); *B29K 2105/0088* (2013.01); *B29K 2105/0097* (2013.01); *B29K 2105/16* (2013.01); *B29L 2009/00* (2013.01); *B29L 2031/30* (2013.01); *B32B 2250/24* (2013.01); *B32B 2307/3065* (2013.01); *B32B 2307/536* (2013.01); *B32B 2307/732* (2013.01); *B32B 2605/08* (2013.01); *B32B 2605/18* (2013.01)

(58) Field of Classification Search
  CPC . B32B 2605/08; B29C 48/21; B29L 2009/00; B29K 2101/10; B29K 2105/0088; B29K 2105/0097
  See application file for complete search history.

(56) References Cited

U.S. PATENT DOCUMENTS

| | | |
|---|---|---|
| 3,799,854 A | 3/1974 | Jerabek |
| 3,919,351 A | 11/1975 | Chang |
| 4,046,729 A | 9/1977 | Scriven et al. |
| 4,147,769 A | 4/1979 | Dea et al. |
| 4,220,679 A | 9/1980 | Backhouse |
| 4,403,003 A | 9/1983 | Backhouse |
| 4,546,045 A | 10/1985 | Elias |
| 4,623,711 A | 11/1986 | Morris et al. |
| 4,681,811 A | 7/1987 | Simpson et al. |
| 4,732,790 A | 3/1988 | Blackburn et al. |
| 4,798,746 A | 1/1989 | Claar et al. |
| 5,071,904 A | 12/1991 | Martin et al. |
| 5,114,989 A | 5/1992 | Elwell et al. |
| 5,262,259 A | 11/1993 | Chou et al. |
| 5,468,802 A | 11/1995 | Wilt et al. |
| 5,777,061 A | 7/1998 | Yonek et al. |
| 6,172,179 B1 | 1/2001 | Zook et al. |
| 6,259,962 B1 | 7/2001 | Gothait |
| 6,454,972 B1 | 9/2002 | Morissette et al. |
| 6,509,418 B1 | 1/2003 | Zook et al. |
| 6,558,753 B1 | 5/2003 | Ylitalo et al. |
| 6,875,800 B2 | 4/2005 | Vanier et al. |
| 6,894,086 B2 | 5/2005 | Munro et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |
| 7,875,666 B2 | 1/2011 | Gilmore et al. |
| 7,879,955 B2 | 2/2011 | Rao et al. |
| 7,955,537 B2 | 6/2011 | Ederer et al. |
| 7,957,825 B2 | 6/2011 | Marsh et al. |
| 8,138,273 B2 | 3/2012 | Rao et al. |
| 8,466,220 B2 | 6/2013 | Rao et al. |
| 8,535,463 B2 | 9/2013 | Allen et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,876,513 B2 | 11/2014 | Lim et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,216,547 B2 | 12/2015 | Elsey |
| 9,370,132 B2 | 6/2016 | Coppola |
| 9,382,640 B2 | 7/2016 | Yamagata |
| 9,422,451 B2 | 8/2016 | Rao et al. |
| 9,452,445 B2 | 9/2016 | Frankenberger |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,708,440 B2 | 7/2017 | Das et al. |
| 9,744,720 B2 | 8/2017 | Napadensk |
| 9,796,858 B2 | 10/2017 | Powell et al. |
| 9,862,059 B2 | 1/2018 | Liebl et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,982,164 B2 | 5/2018 | Rolland et al. |
| 9,992,917 B2 | 6/2018 | Yanke et al. |
| 10,016,941 B1 | 7/2018 | Beard et al. |
| 10,059,595 B1 | 8/2018 | Farbstein |
| 10,071,350 B2 | 9/2018 | Lewis et al. |
| 10,074,449 B2 | 9/2018 | White et al. |
| 10,139,808 B2 | 11/2018 | Engelbart et al. |
| 10,232,549 B2 | 3/2019 | Hayes et al. |
| 10,243,295 B2 | 3/2019 | Matlack et al. |
| 10,253,195 B2 | 4/2019 | Fenn et al. |
| 10,259,956 B2 | 4/2019 | Chopra et al. |
| 10,350,823 B2 | 7/2019 | Rolland et al. |
| 10,400,057 B2 | 9/2019 | Kwisnek et al. |
| 10,449,714 B2 | 10/2019 | Achten et al. |
| 10,464,031 B2 | 11/2019 | Lewis et al. |
| 10,538,031 B2 | 1/2020 | Chen et al. |
| 10,625,470 B2 | 4/2020 | Sun et al. |
| 10,639,842 B2 | 5/2020 | Leibig et al. |
| 10,639,844 B2 | 5/2020 | Rolland et al. |
| 10,683,381 B2 | 6/2020 | Abell et al. |
| 10,688,770 B2 | 6/2020 | Boydston et al. |
| 10,772,246 B2 | 9/2020 | Speaker et al. |
| 10,792,860 B2 | 10/2020 | Wantanabe et al. |
| 10,932,399 B1 | 2/2021 | Nowak et al. |
| 10,947,969 B2 | 3/2021 | Overend et al. |
| 10,948,082 B2 | 3/2021 | Delong et al. |
| 10,968,340 B1 | 4/2021 | Mapkar et al. |
| 11,192,632 B2 | 12/2021 | Dovey |
| 11,209,084 B2 | 12/2021 | Dovey |
| 2001/0043990 A1 | 11/2001 | Chong et al. |
| 2002/0122928 A1 | 9/2002 | Botrie et al. |
| 2002/0182339 A1 | 12/2002 | Taylor et al. |
| 2003/0004599 A1 | 1/2003 | Herbak |
| 2004/0189311 A1 | 9/2004 | Glezer et al. |
| 2004/0220327 A1 | 11/2004 | Cosman et al. |
| 2005/0171237 A1 | 8/2005 | Patel et al. |
| 2005/0287354 A1 | 12/2005 | Jennings et al. |
| 2006/0046068 A1 | 3/2006 | Barancyk et al. |
| 2006/0108450 A1 | 5/2006 | Klinkenberg et al. |
| 2007/0141267 A1 | 6/2007 | Sonnenschein et al. |
| 2009/0065357 A1 | 3/2009 | Glezer et al. |
| 2009/0126225 A1 | 5/2009 | Jarvis |
| 2010/0041839 A1 | 2/2010 | Anderson et al. |
| 2010/0076143 A1 | 3/2010 | Yakulis et al. |
| 2010/0113252 A1 | 5/2010 | Bordia et al. |
| 2010/0234485 A1 | 9/2010 | Kohli et al. |
| 2012/0117822 A1 | 5/2012 | Jarvis |
| 2012/0159785 A1 | 6/2012 | Pyles et al. |
| 2012/0244337 A1 | 9/2012 | Gavin |
| 2012/0313056 A1 | 12/2012 | Baran et al. |
| 2013/0073073 A1 | 3/2013 | Pettis |
| 2013/0095253 A1 | 4/2013 | Lindsay et al. |
| 2013/0196124 A1 | 8/2013 | Flores et al. |
| 2013/0237661 A1 | 9/2013 | Brust et al. |
| 2013/0253084 A1 | 9/2013 | Duggal et al. |
| 2013/0271526 A1 | 10/2013 | Ciampini et al. |
| 2013/0284359 A1 | 10/2013 | Virnelson |
| 2013/0302575 A1 | 11/2013 | Moegele et al. |
| 2013/0344340 A1 | 12/2013 | Senkfor et al. |
| 2014/0012406 A1 | 1/2014 | Cioffi et al. |
| 2014/0017460 A1 | 1/2014 | Xu et al. |
| 2014/0220354 A1 | 8/2014 | Gao et al. |
| 2014/0323647 A1 | 10/2014 | Voit et al. |
| 2014/0331520 A1 | 11/2014 | Yakulis et al. |
| 2015/0014881 A1 | 1/2015 | Elsey |

(56) References Cited

U.S. PATENT DOCUMENTS

| | | |
|---|---|---|
| 2015/0307738 A1 | 10/2015 | Schmucker et al. |
| 2015/0321434 A1 | 11/2015 | Sterman et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244980 A1 | 8/2016 | Urban et al. |
| 2016/0250688 A1 | 9/2016 | Coppola |
| 2016/0257067 A1 | 9/2016 | Boydston et al. |
| 2016/0271872 A1 | 9/2016 | Sand |
| 2016/0271878 A1 | 9/2016 | Nuechterlein et al. |
| 2016/0297104 A1 | 10/2016 | Guillemette et al. |
| 2016/0329519 A1 | 11/2016 | Yu et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0149025 A1 | 5/2017 | Hashimoto et al. |
| 2017/0229685 A1 | 8/2017 | Hashimoto et al. |
| 2017/0246802 A1 | 8/2017 | Pyzik et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0321083 A1 | 11/2017 | Fenn et al. |
| 2017/0341296 A1 | 11/2017 | Fenn et al. |
| 2017/0369620 A1 | 12/2017 | Abell et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0207863 A1 | 7/2018 | Porter et al. |
| 2018/0215854 A1 | 8/2018 | Paranthaman et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0362784 A1 | 12/2018 | Gorin et al. |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1 | 2/2019 | Busbee et al. |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0256751 A1 * | 8/2019 | Townsend ................ C08K 5/17 |
| 2019/0276689 A1 | 9/2019 | Dhoble et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2021/0008793 A1 | 1/2021 | Pokrass et al. |

FOREIGN PATENT DOCUMENTS

| | | | |
|---|---|---|---|
| CN | 101014665 A | 8/2007 | |
| CN | 102896923 A | 1/2013 | |
| CN | 104031383 A | 9/2014 | |
| CN | 104505470 A | 4/2015 | |
| CN | 105313332 A | 2/2016 | |
| CN | 107471629 A | 12/2017 | |
| CN | 109041563 A | 12/2018 | |
| CN | 109247005 A | 1/2019 | |
| CN | 110628192 A | 12/2019 | |
| CN | 111087792 A | 5/2020 | |
| CN | 111391305 A | 7/2020 | |
| CN | 111774561 A | 10/2020 | |
| DE | 19937770 A1 | 2/2001 | |
| DE | 102011003619 A1 | 8/2012 | |
| DE | 102015220699 A1 | 3/2017 | |
| EP | 0437374 B1 | 12/1996 | |
| EP | 2416950 A1 | 2/2012 | |
| EP | 2658702 A1 | 11/2013 | |
| EP | 2719484 A1 | 4/2014 | |
| EP | 2851208 A1 | 3/2015 | |
| EP | 3059171 A1 | 8/2016 | |
| EP | 3232071 A1 | 10/2017 | |
| EP | 3550142 A1 | 10/2019 | |
| EP | 3626442 A1 | 3/2020 | |
| EP | 3626443 A1 | 3/2020 | |
| FR | 3039553 A1 | 2/2017 | |
| JP | H03-210364 A | 9/1991 | |
| JP | H04-366617 A | 12/1992 | |
| JP | 2001-518408 A | 10/2001 | |
| JP | 2002-166460 A | 6/2002 | |
| JP | 2003-506228 | 2/2003 | |
| JP | 2011-105906 A | 6/2011 | |
| JP | 5085800 B1 | 11/2012 | |
| JP | 2013-136724 A | 7/2013 | |
| JP | 2014-521797 A | 8/2014 | |
| JP | 2015-512816 A | 4/2015 | |
| JP | 2015-195090 A | 11/2015 | |
| JP | H06-026637 B2 | 11/2015 | |
| JP | 2016-530430 A | 9/2016 | |
| JP | 2017-022135 A | 1/2017 | |
| JP | 62-33354 B2 | 12/2017 | |
| JP | 2018-002896 A | 1/2018 | |
| JP | 2018-502197 A | 1/2018 | |
| JP | 2019-504919 A | 2/2019 | |
| KR | 10-1153303 B1 | 6/2012 | |
| KR | 101891560 B1 | 3/2018 | |
| RU | 2247087 C2 | 2/2005 | |
| RU | 2332265 C2 | 8/2008 | |
| RU | 2532190 C2 | 10/2014 | |
| RU | 2014113527 A | 10/2015 | |
| RU | 2673840 C1 | 11/2018 | |
| RU | 2677143 C1 | 1/2019 | |
| TW | 201509698 A | 3/2015 | |
| TW | 201821248 A | 6/2018 | |
| WO | 9916618 | 4/1999 | |
| WO | 2001/010630 A1 | 2/2001 | |
| WO | 2004/076852 A1 | 9/2004 | |
| WO | 2006/029144 A1 | 3/2006 | |
| WO | 2006/073695 A1 | 7/2006 | |
| WO | 2007/044735 A2 | 4/2007 | |
| WO | 2010/024904 A1 | 3/2010 | |
| WO | 2013/091003 A1 | 6/2013 | |
| WO | 2015/147973 A1 | 10/2015 | |
| WO | 2016/061060 A1 | 4/2016 | |
| WO | 2016/085914 A1 | 6/2016 | |
| WO | 2016/085976 A1 | 6/2016 | |
| WO | 2016/085992 A1 | 6/2016 | |
| WO | 2016/106352 A1 | 6/2016 | |
| WO | 2016/149032 A1 | 9/2016 | |
| WO | 2016/164562 A1 | 10/2016 | |
| WO | 2016/182805 A1 | 11/2016 | |
| WO | 2016/201103 A1 | 12/2016 | |
| WO | 2017/087055 A1 | 5/2017 | |
| WO | 2017/095658 A1 | 6/2017 | |
| WO | 2017/112682 A1 | 6/2017 | |
| WO | 2017/144461 A1 | 8/2017 | |
| WO | 2018/005686 A1 | 1/2018 | |
| WO | 2018/007579 A1 | 1/2018 | |
| WO | 2017/130685 A1 | 2/2018 | |
| WO | 2018/026829 A1 | 2/2018 | |
| WO | WO-2018031532 A1 * | 2/2018 | ............. C08G 18/10 |
| WO | 2018/049038 A1 | 3/2018 | |
| WO | 2018/072034 A1 | 4/2018 | |

(56) References Cited

FOREIGN PATENT DOCUMENTS

| WO | 2018/085650 | A1 | 5/2018 |
|---|---|---|---|
| WO | 2017/092764 | A1 | 6/2018 |
| WO | 2018/106822 | A1 | 6/2018 |
| WO | 2018/113875 | A1 | 6/2018 |
| WO | 2018/157148 | A1 | 8/2018 |
| WO | 2018/236817 | A1 | 12/2018 |
| WO | 2019/089235 | A1 | 5/2019 |
| WO | 2019/173511 | A1 | 9/2019 |
| WO | 2019191509 | A1 | 10/2019 |
| WO | 2019204770 | A1 | 10/2019 |
| WO | 2019/217848 | A1 | 11/2019 |
| WO | 2019/224699 | A1 | 11/2019 |
| WO | 2020/107365 | A1 | 6/2020 |
| WO | 2020/147567 | A1 | 7/2020 |
| WO | 2020/251661 | A1 | 12/2020 |

OTHER PUBLICATIONS

Covestro Desmodur® VL Product Data Sheet, Sep. 1, 2015, 3 pages.
International Search Report and Written Opinion for Application No. PCT/US2015/062297, mailed on Mar. 4, 2016, 10 pages.
International Search Report and Written Opinion for Application No. PCT/US2015/062445, mailed on Mar. 1, 2016, 10 pages.
International Search Report and Written Opinion for Application No. PCT/US2015/062412, mailed on Mar. 2, 2016, 9 pages.
International Search Report and Written Opinion for Application No. PCT/IB2018/056254, mailed on Nov. 19, 2018, 10 pages.
International Search Report and Written Opinion for Application No. PCT/US2019/026672, mailed on Jul. 25, 2019, 12 pages.
International Search Report and Written Opinion for Application No. PCT/US2020/017428, mailed on Jul. 29, 2020, 18 pages.
International Search Report and Written Opinion for Application No. PCT/US2020/017455, mailed on May 25, 2020, 11 pages.
International Search Report and Written Opinion for Application No. PCT/US2020/017464, mailed on May 25, 2020, 9 pages.
International Search Report and Written Opinion for Application No. PCT/US2020/039557, mailed on Oct. 8, 2020, 13 pages.
International Search Report and Written Opinion for Application No. PCT/US2020/017417, mailed on Jun. 12, 2020, 10 pages.
International Search Report and Written Opinion for Application No. PCT/US2020/017441, mailed on Jun. 22, 2020, 8 pages.
International Preliminary Report on Patentability for Application No. PCT/US2015/062297, mailed on May 30, 2017, 7 pages.
International Preliminary Report on Patentability for Application No. PCT/US2015/062445, mailed on May 30, 2017, 8 pages.
International Preliminary Report on Patentability for Application No. PCT/US2015/062412, mailed on May 30, 2017, 7 pages.
First Report for Australian Application No. 2015 353730, mailed on Mar. 15, 2018, 6 pages.
First Report for Australian Application No. 2015 353634, mailed on Mar. 5, 2018, 6 pages.
First Report for Australian Application No. 2015 353618, mailed on Sep. 21, 2017, 6 pages.
Canadian Office Action for Application No. 2,968,549, mailed on May 7, 2018, 4 pages.
Canadian Office Action for Application No. 2,968,670, mailed on Jun. 11, 2018, 3 pages.
Canadian Office Action for Application No. 2,968,538, mailed on Jun. 6, 2018, 4 pages.
Russia Office Action for Application No. 2017121858, mailed on May 16, 2018, 2 pages.
Russia Office Action for Application No. 2017122126, mailed on May 16, 2018, 4 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
"The JEFFAMINE® Polyetheramines," Huntsman, 2007, 6 pages.
Broekaert, "Polyurea Spray Coatings: The Technology and Latest Developments," Paint & Coatings Industry, Mar. 2002, 15 pages.
FORMLABS White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Quadion LLC, Minnesota Rubber and Plastic, Thermoset Plastics vs Thermoplastics, https://www.mnrubber.com/Design_Guide/5-2.html, Oct. 25, 2014, accessed Nov. 7, 2019.
Rios, Orlando, "Evaluation of Advanced Polymers for Additive Manufacturing," CRADA Final Report NFE-14-05252, Oak Ridge National Laboratory, Sep. 8, 2017, 29 pages.
Smith, P. et al., "Reactive inkjet printing," Journal of Materials Chemistry, 2012, vol. 22, p. 10965-10970.
Viscosity of Water, retrieved from https://www.engineersedge.com/physics/water_density_viscosity_specific_weight_13146.htm, accessed Apr. 20, 2020, first published Jun. 25, 2014.
Zhu et al., "Water-based coatings for 3D printed parts", Journal of Coatings Technology and Research, Jul. 2015, vol. 12, No. 5, p. 889-897.
International Preliminary Report on Patentability received for PCT Patent Application No. PCT/US2020/017428, mailed on Aug. 26, 2021, 13 pages.

* cited by examiner

MULTILAYER SYSTEMS AND METHODS OF MAKING MULTILAYER SYSTEMS

This application claims the benefit under 35 U.S.C. § 119(e) of U.S. Provisional Application No. 62/803,727 filed on Feb. 11, 2019, which is incorporated by reference in its entirety.

FIELD

The disclosure relates to methods of making multilayer systems comprising at least one sealant layer, multilayer systems made using the methods, and uses of multilayer systems. Each individual layer of a multilayer system can be designed to have a desired property. Individual layers of a multilayer system can also have an inhomogeneous concentration of one or more constituents within an individual layer. The multilayer systems can be made using extrusion methods such as three-dimensional printing. The multilayer systems can be used as sealants.

BACKGROUND

Sealants are typically provided as homogeneous compositions that are applied to a substrate. In one-part systems the sealant is applied to a substrate and curing is initiated by application of energy such as by exposure to ultraviolet radiation. In two-part systems, the individual parts are combined and mixed prior to use and the curing reaction proceeds when the reactive components are combined. Performance attributes for cured sealants can include, for example, one or more of chemical resistance, low-temperature flexibility, hydrolytic stability, high temperature resistance, tensile strength, % elongation, substrate adhesion, adhesion to an adjoining layer, tack-free time, time to Shore 10A hardness, electrical conductivity, EMI/RFI shielding, static dissipation, thermal conductivity, low density, corrosion resistance, surface hardness, fire retardance, UV resistance, and rain erosion resistance. Multilayer systems having at least one sealant and methods for making the sealant systems having one or more of these attributes are desirable.

SUMMARY

According to the present invention, methods of making a multilayer system comprising two or more layers, wherein one or more of the layers comprises a sealant layer, comprise: (a) mixing a first component and a second component to form a coreactive sealant composition, wherein the coreactive sealant composition comprises a first reactive compound and a second reactive compound; and the first reactive compound is reactive with the second reactive compound; (b) extruding the coreactive sealant composition to form an extrudate; and (c) depositing the extrudate to form the sealant layer.

BRIEF DESCRIPTION OF THE DRAWINGS

The drawings described herein are for illustration purposes only. The drawings are not intended to limit the scope of the present disclosure.

DETAILED DESCRIPTION

Figure 1A:
FIGS. 1A-1D show cross-sectional views of multilayer systems comprising at least one sealant layer provided by the present disclosure.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

"Alkanearene" refers to a hydrocarbon group having one or more aryl groups and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{0-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be $C_{6-18}$ alkanearenediyl, $C_{6-16}$ alkanearenediyl, $C_{6-12}$ alkanearenediyl, $C_{6-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl.

Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{6-18}$ alkanecycloalkane, $C_{6-16}$ alkanecycloalkane, $C_{6-12}$ alkanecycloalkane, $C_{6-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl. Alkanediyl groups can include single, double, and/or triple bonds between carbon atoms.

"Alkenyl" group refers to the structure —CR=$C(R)_2$ where the alkenyl group is a group and is bonded to a larger molecule. In such embodiments, each R may independently comprise, for example, hydrogen and $C_{1-3}$ alkyl. Each R can be hydrogen and an alkenyl group can have the structure —CH=$CH_2$.

"Alkoxy" refers to a OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Catalyst" refers to a substance that increases the rate of a reaction without modifying the overall standard Gibbs energy change in the reaction.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

"Coating" refers to a thin film such as a film having an applied and dried thickness less than 500 µm, less than 100 µm, or less than 50 µm. A coating can have a thickness less than that of a layer forming a multilayer system.

"Component" refers to a composition in which the constituents of the component are not coreactive until combined and mixed with another component to form a coreactive composition.

A compound having a reactive functionality refers to a compound that has functional group capable of reacting with a complimentary reactive functional group of another compound. The reactive functional group can be bonded to the ends of the compound, may be bonded to the backbone of the compound.

"Constituent" refers to an organic compound or an inorganic compound. A composition and a component can comprise one or more constituents. Examples of constituents include prepolymers, monomers, polyfunctionalizing agents, and additives as disclosed herein.

A "core" of a polyfunctionalizing agent B(—V)$_z$ refers to the moiety B.

A "core" of a compound or a polymer refers to the segment between reactive groups. For example, the core of a polythiol HS—R—SH is —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Coreactive composition" refers to a composition comprising at least two reactive compounds capable of reacting with each other. A coreactive composition refers to a composition comprising two or more coreactive compounds capable of reacting at a temperature, for example, less than 50° C., less than 40° C., less than 30° C., or less than 20° C. The reaction between the two or more reactive compounds may be initiated by combining and mixing the two or more coreactive compounds, by adding a catalyst to a coreactive composition comprising two or more coreactive compounds and/or by activating a polymerization initiator in a coreactive composition comprising the two or more coreactive compounds. A coreactive composition can be formed, for example, by combining and mixing a first reactive component comprising a first reactive compound with a second reactive component comprising a second reactive compound, wherein the first reactive compound can react with the second reactive compound. A coreactive composition can be a thermosetting composition and when cured forms a thermoset.

"Coreactive non-sealant composition" refers to a coreactive composition that is not formulated as a sealant. Although a cured coreactive non-sealant composition can exhibit some properties of a sealant, the primary function of a cured coreactive non-sealant composition is not to act as a sealant.

"Coreactive sealant composition" refers to a coreactive composition formulated as a sealant.

"Coreactive three-dimensional printing" refers to a method as disclosed herein in which a coreactive composition is extruded through a nozzle or extrusion in successive layers to form a part.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Cure time" refers to the duration from when the curing reaction of a coreactive composition is first initiated, for example, by combining and mixing to coreactive components to form the coreactive composition and/or by exposing a coreactive composition to actinic radiation, until a layer prepared from the coreactive composition exhibits a hardness of Shore 30A at conditions of 25° C. and 50% RH. For an actinic radiation-curable composition the cure time refers to the duration from when the coreactive composition is first exposed to actinic radiation to the time when a layer prepared from the exposed coreactive composition exhibits a hardness of Shore 30A at conditions of 25° C. and 50% RH.

A dash ("-") that is not between two letters or symbols is used to indicate a point of bonding for a substituent or between two atoms. For example, —$CONH_2$ is attached through the carbon atom.

"Derived from" as in "a moiety derived from a compound" refers to a moiety that is generated upon reaction of a parent compound with a reactant. For example, a bis(alkenyl) compound $CH_2$=CH—R—CH=$CH_2$ can react with another compound such as a compound having thiol groups to produce the moiety —$(CH_2)_2$—R—$(CH_2)_2$—, which is derived from the reaction of the alkenyl groups with the thiol groups. As another example, for a parent diisocyanate having the structure O=C=N—R—N=C=O, a moiety derived from the diisocyanate has the structure —C(O)—NH—R—NH—C(O)—.

"Derived from the reaction of —R with a thiol" refers to a moiety —R'— that results from the reaction of a thiol group with a moiety comprising a group reactive with a thiol group. For example, a group R— can comprise $CH_2$=CH—$CH_2$—O—, where the alkenyl group $CH_2$=CH— is reactive with a thiol group —SH. Upon reaction with a thiol group, the moiety —R'— is —$CH_2$—$CH_2$—$CH_2$—O—.

"Extrudate" refers to a coreactive composition that have been extruded through a nozzle or extrusion die. A coextrudate refers to two or more coreactive compositions that have been simultaneously extruded through a nozzle or coextrusion die.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Fracture energy" is determined according to ASTM D7313.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

A monomer refers to a low molecular weight compound and can have a molecular weight, for example, less than 1,000 Da, less than 800 Da less than 600 Da, less than 500 Da, less than 400 Da, or less than 300 Da. A monomer can have a molecular weight, for example, from 100 Da to 1,000 Da, from 100 Da to 800 Da, from 100 Da to 600 Da, from 150 Da, to 550 Da, or from 200 Da to 500 Da. A monomer can have a molecular weight greater than 100 Da, greater than 200 Da, greater than 300 Da, greater than 400 Da, greater than 500 Da, greater than 600 Da, or greater than 800 Da. A monomer can have a reactive functionality of two or more, for example, from 2 to 6, from 2 to 5, or from 2 to 4. A monomer can have a functionality of 2, 3, 4, 5, 6, or a combination of any of the foregoing. A monomer can have an average reactive functionality, for example, from 2 to 6, from 2 to 5, from 2 to 4, from 2 to 3, from 2.1 to 2.8, or from 2.2 to 2.6. Reactive functionality refers to the number of reactive functional groups per molecule. A combination of molecules having a different number of reactive functional groups can have a non-integer average number of reactive functional groups.

A "polyalkenyl" refers to a compound having at least two alkenyl groups. The at least two alkenyl groups can be alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A polyfunctionalizing agent can have the structure:

where B is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents, each —V can have the structure, for example, —R—SH or —R—CH=$CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl. When the moiety V is reacted with another compound the moiety —$V^1$— results and is said to be derived from the reaction with the other compound. For example, when V is —R—CH=$CH_2$ and is reacted, for example, with a thiol group, the moiety $V^1$ is —R—$CH_2$—$CH_2$— is derived from the reaction.

"Polymerization initiator" refers to a compound capable of initiating a polymerization reaction following activation of the polymerization initiator. A polymerization initiator can be activated, for example, upon exposure to actinic radiation, heat, and/or shear forces.

"Prepolymer" refers to homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises a backbone and reactive groups capable of reacting with another compound such as a curing agent or crosslinker to form a cured polymer. A prepolymer includes multiple repeating subunits bonded to each other than can be the same or different. The multiple repeating subunits make up the backbone of the prepolymer.

"Prepolymer backbone" refers to a segment between the reactive functional groups of the prepolymer. A prepolymer backbone typically includes repeating subunits. For example, the backbone of a polythiol having the structure HS—$(R)_n$—SH is —$(R)_n$—.

"Reaction product of" means a chemical reaction product(s) of at least the recited reactants and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

"Reactive compound" refers to a compound that is reactive with another compound. A reactive compound can comprise one or more functional groups that are reactive with functional groups of another compound.

"Sealant layer" refers to a layer that when cured functions as a sealant. A sealant layer can be prepared from a coreactive sealant composition.

Shore A hardness is measured using a Type A durometer in accordance with ASTM D2240.

Specific gravity and density of particles is determined according to ISO 787-11.

A "sulfur-containing prepolymer" refers to a prepolymer in which the backbone comprises one or more thioether —$S_n$— groups, where n can be, for example, 1 to 6, in the backbone of the prepolymer. Prepolymers that contain only thiol or other sulfur-containing groups either as groups or as pendent groups of the prepolymer are not encompassed by sulfur-containing prepolymers. The prepolymer backbone refers to the portion of the prepolymer having repeating segments. Thus, a prepolymer having the structure HS—R—R(—$CH_2$—SH)—[—R($CH_2$)$_2$—S(O)$_2$—($CH_2$)—S(O)$_2$]$_n$—CH=$CH_2$ where each R is a moiety that does not contain a sulfur atom in the prepolymer backbone, is not encompassed by a sulfur-containing prepolymer. A prepolymer having the structure) HS—R—R(—$CH_2$—SH)—[—R—($CH_2$)$_2$—S(O)$_2$—($CH_2$)—S(O)$_2$]—CH=$CH_2$ where at least one R is a moiety that contains a sulfur atom, such as a thioether group, is encompassed by a sulfur-containing prepolymer. Examples of sulfur-containing prepolymers include polythioether prepolymers, polysulfide prepolymers, sulfur-containing polyformal prepolymers, and monosulfide prepolymers.

"Substituted" refers to a group in which one or more hydrogen atoms are each independently replaced with the same or different substituent(s). A substituent can comprise, for example, halogen, —S(O)$_2$OH, —S(O)$_2$, —SH, —SR where R is $C_{1-10}$ alkyl, —COOH, —$NO_2$, —$NR_2$ where each R independently comprises hydrogen and $C_{1-10}$ alkyl, —CN, =O, $C_{1-10}$alkyl, —$CF_3$, —OH, phenyl, $C_{2-10}$ heteroalkyl, $C_{5-6}$ heteroaryl, $C_{1-10}$ alkoxy, or —COR where R is $C_{1-10}$ alkyl. A substituent can be, for example, —OH, —$NH_2$, or $C_{1-3}$ alkyl.

"Tack free time" refers to the duration from the time when the curing reaction of a coreactive composition is initiated, for example, by mixing two coreactive components or by exposing a coreactive composition to energy such as UV radiation, until the time when the coreactive composition is no longer tack free. The property of being tack free is determined by applying a polyethylene sheet to the surface of the layer with hand pressure and observing whether the sealant adheres to the surface of the polyethylene sheet, where the layer is considered to be tack free if the polyethylene sheet separates easily from the layer. For an actinic radiation-curable coreactive composition, the tack free time refers to the time from when the coreactive composition is exposed to actinic radiation to the time when a layer prepared from the coreactive composition is no longer tack free.

Tensile strength and elongation are measured according to AMS 3279.

"Thermoset" refers to a cured thermosetting polymer composition.

"Thermosetting composition" refers to a composition comprising coreactive compounds that change irreversibly into an infusible, insoluble polymer network by curing. Curing is the chemical process of converting a prepolymer and curing agents into a polymer of higher molecular weight and then into a polymer network. Curing results in chemical reactions that create extensive cross-linking between A polymer network is a highly ramified structure in which essentially each constitutional unit is connected to each other constitutional unit and to the macroscopic phase boundary by many paths through the structure, the number of such paths increasing with the average number of intervening constitutional units; the paths must on average co-extensive with the structure.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Methods of making a multilayer system comprising two or more layers, wherein one or more of the layers comprises a sealant layer, comprise (a) mixing a first component and a second component to form a coreactive sealant composition, wherein, the coreactive sealant composition comprises a first reactive compound and a second reactive compound; and the first reactive compound is reactive with the second reactive compound; (b) extruding the coreactive sealant composition to form an extrudate; and (c) depositing the extrudate to form the sealant layer.

A sealant composition refers to a material that has the ability, when cured, to form a sealant capable of resisting at least one of an atmospheric condition, such as moisture and/or temperature and at least partially block the transmission of materials, such as water, solvent, fuel, hydraulic fluid and other liquids and gasses. A sealant can exhibit chemical resistance such as resistance to fuels, hydraulic fluids, solvents, greases, lubricants, salt spray, gases, oils, and/or cleaning fluids. A chemically resistant material can exhibit, for example, a % swell less than 25%, less than 20%, less than 15%, or less than 10% following immersion in the chemical for 7 days at 70° C. as determined according to EN ISO 10563. A multilayer system prepared using methods provided by the present disclosure can meet or exceed the requirements for aerospace sealants as set forth in AMS 3277. A sealant is designed to minimize the penetration of gases and liquids to a surface during in the use environment of the part being sealed.

A multilayer system can comprise two or more layers in which each of the layers can be designed to optimize one or more properties of the multilayer system. At least one of the layers can comprise a sealant layer. In a multilayer system an exterior layer or an outermost layer can comprise a sealant and can be designed, for example, to exhibit chemical resistance and an internal layer can be designed to exhibit, for example, low-density, substrate adhesion, and/or high tensile strength and % elongation. As another example, the exterior layer of a multilayer system can exhibit a fast cure rate to facilitate handling and manufacturability and underlying layers can have slower cure rates that can facilitate, for example, enhanced adhesion and/or enhanced mechanical properties. A multilayer system also can have the potential to reduce costs. Expensive material can be used in only those layers where they are desired for their properties, and other layers can use alternative materials.

A multilayer sealant system can comprise any suitable number of layers such as 2, 3, 4, 5, or 6 layers, where each layer is formed from a different material and can exhibit different properties. A multilayer sealant system can comprise one sealant layer, can comprise more than one sealant layer, or each layer can comprise a sealant layer. A multilayer system can comprise at least one sealant layer, and each of the other layers can independently comprise a sealant layer or a non-sealant layer. A non-sealant layer is a layer that is not intended to primarily function as a sealant in the multilayer sealant system, although a non-sealant layer can have some ability to restrict penetration of gases and liquids.

Figure 1B:
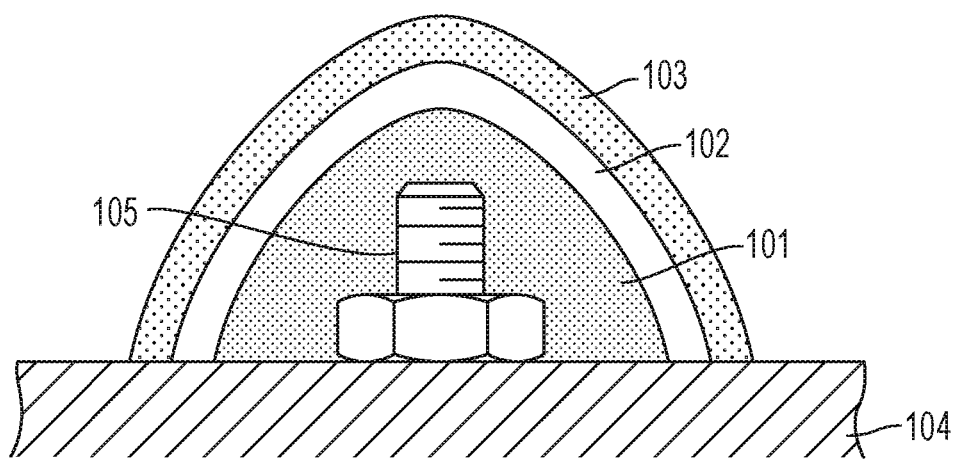

An example of a multilayer system is shown in FIGS. 1A and 1B. The multilayer system shown in FIG. 1A includes an inner first layer 101 underlying an intermediate second layer 102, which underlies an exterior third layer 103. FIG. 1B shows a multilayer system overlying a fastener 105 mounted to substrate 104, and includes an inner first layer 101, an overlying intermediate second layer 102, and an overlying exterior third layer 103. Only the exterior third layer 103 can comprise a sealant or all layers 101/102/103 can comprise a sealant. For example, inner layer 101 can comprise a composition configured to promote adhesion to a surface, and intermediate layer 102 can comprise a composition having high tensile strength and/or % elongation.

Figure 1C:
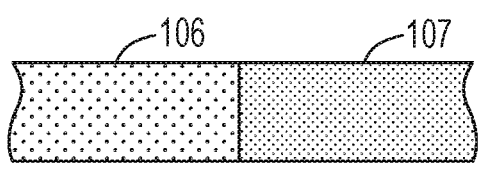
Figure 1D:
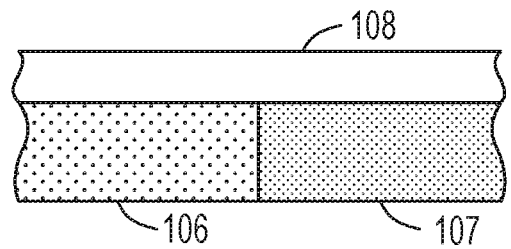

Another example of a multilayer system is shown in FIG. 1C in which a first layer 106 is adjacent a second layer 107. FIG. 1D shows a multilayer system in which a first layer 106 is adjacent a second layer 107, and a third layer 108 overlies both the first and second layers 106/107. In FIG. 1C first layer 106 and/or second layer 107 can be a sealant. In FIG. 1D, exterior layer 108 can be a sealant layer and layers 106 and 107 can be non-sealant layers. In FIG. 1D, each of layers 106/107/108 can independently be selected from a sealant layer and a non-sealant layer, where at least one of layers 106/107/108 is a sealant layer. Other configurations of the various layers of a multilayer system are possible.

At least one of the layers of a multilayer system can be different than another layer of the multilayer system. For example, the layers can differ in the type and/or amount of the constituents such as the prepolymers, monomers, and/or additives in the layers. The differences in the type and/or amount of the constituents can result in the various layers of the multilayer system having different properties. Each of the layers can independently comprise, for example, reactive compounds, catalysts, polymerization initiators, adhesion promoters, filler, reactive diluents, colorants, rheological control agents, and/or photochromic agents that can be the same or different or be present in a different wt % or vol % than another layer of the multilayer system.

The constituents of a layer can be different than those in another layer, for example, in terms of composition, curing chemistries, molecular weights of constituents, sizes of constituents, wt % of constituents, and/or vol % of constituents.

For example, each layer can independently be configured to provide a cured layer, for example, that exhibits one or more of chemical resistance, low-temperature flexibility, hydrolytic stability, high temperature resistance, high tensile/elongation, bonding to the substrate, bonding to a primer coating, adhesion to an adjoining layer, fast tack-free time, cure time to a hardness of Shore 10A, time to complete cure, electrical conductivity, EMI/RFI shielding, static dissipation, corrosion resistance, cured hardness, low-density, and/or sound damping.

Each of the layers of a multilayer system can have the same or different curing chemistry than another layer of the multilayer system and/or than an adjoining layer of the multilayer system. To provide a robust interface between adjacent layers it can be desirable that adjacent layers are chemically or physically bonded. The formation of chemical or physical bonding between layers can be facilitated by using coreactive compositions for the adjacent layers that have the same curing chemistry and/or that contain compounds capable of coreacting with compounds in adjacent layers.

Adjoining layers of a coreactive composition can chemically bond and/or physical bond to create a mechanically strong interlayer interface. The strength of the interlayer interface can be determined by measuring the fracture energy according to ASTM D7313. Chemically resistant multilayer sealants made using methods provided by the present disclosure can have a fracture energy that is substantially the same as the fracture energy of an individual layer. For example, the fracture energy of the multilayer sealant and the fracture energy of an individual cured layer of the coreactive composition can be, for example, within less than 10%, less than 5%, less than 2% or less 1%.

Each layer of a multilayer system can be selected to enhance a desired property or properties of individual cured layers. For example, an innermost layer can provide enhanced surface adhesion to a substrate, but not necessarily have a low density. For example, an outermost layer can be formulated to provide enhanced chemical resistance and/or be able to dissipate static charge. An intermediate layer between the inner and outer layers can be low density and be formulated to exhibit enhanced mechanical properties. In this way each layer of a multilayer system can be configured to optimize a different property or combination of properties without compromising other properties of a layer, and where the other overall properties of the multilayer s system can be imparted by other layers.

Figure 2A:
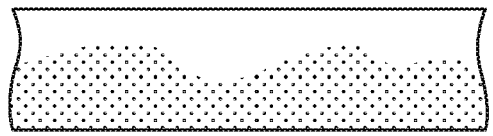
FIG. 2A show cross-sectional views of a layer of a multilayer system provided by the present disclosure in which the concentration of a constituent varies within the thickness of the layer.
Figure 2B:
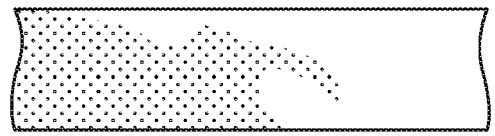
FIG. 2B show cross-sectional views of a layer of a multilayer system provided by the present disclosure in which the concentration of a constituent varies within a lateral dimension of the layer.

A layer of a multilayer system can be inhomogeneous within the horizontal plane of the layer and/or perpendicular to the horizontal plane of the layer. The inhomogeneity can be discrete or continuous. FIG. 2A shows a cross-section of a layer comprising, for example, an additive such as a filler in which the concentration of the filler, identified by the stripling, varies within the dimension perpendicular to the horizontal plane of the layer. FIG. 2B shows a cross-section of a layer in which the concentration of the filler varies both within the horizontal plane of the layer and in certain regions, within the dimension perpendicular to the horizontal plane of the layer.

The composition within a layer of a multilayer system can also vary within the layer. The composition can vary across the thickness of a layer, i.e., the cross-sectional dimension, and/or within a lateral dimension of a layer, i.e., the longitudinal dimension. For example, a concentration of a constituent such as a coreactive compound and/or an additive can vary across the thickness of a layer such that, for example, the concentration is higher toward one side of the layer than toward the opposite side of the layer, or the concentration can be higher in the middle of a layer than on either of the two sides. The concentration of one or more constituents can vary linearly, non-linearly, continuously, discontinuously, and/or discretely across the thickness of a layer. Similarly, a concentration of one or more constituents such as a coreactive compound and/or an additive can vary within a lateral dimension of a layer such as in a dimension orthogonal to the thickness of the layer. For example, the concentration of a constituent such as a compound and/or an additive can be higher on one side of a layer than on another side of the layer. The concentration or a constituent can vary within certain regions of the layer. The concentration of a constituent can vary linearly, non-linearly, continuously, discontinuously, and/or discretely across a lateral dimension of a layer.

Each of the layers forming a multilayer system provided by the present disclosure can independently comprise an internal compositional structure. For example, the composition can be substantially uniform throughout the thickness of a layer or can vary across the thickness of a layer. By uniform is meant that the concentration of each of the constituents forming a layer is within 10%, within 5%, or within 1%, or within 0.1% of a nominal concentration throughout the layer, where the nominal concentration refers to an average concentration of the constituent within the layer. For example, the composition can be uniform within the thickness dimension of a layer or can vary within the lateral dimension, i.e., orthogonal to the thickness dimension, of the layer.

A coreactive composition used to form a layer of a multilayer system can comprise at least two coreactive compounds and one or more additives. Within a layer the concentration of a coreactive compound and/or the one or more additives can be substantially the same such as within +/−5%, within +/−1%, or within +/−0.5%. Alternatively, within a layer the concentration of a coreactive compound and/or the one or more additives can vary. The concentration can vary across the thickness of a layer and/or in the longitudinal dimension of a layer. Also, the concentration of a coreactive compound and/or the one or more additives can vary in a portion of the thickness and/or a portion of the longitudinal dimension of a layer.

These layers can be referred to as structured layers to indicate that the layers are characterized by an internal compositional structure and that the composition is not uniform throughout the layer.

The composition within a structured layer can vary discretely, continuously, discontinuously, linearly, non-linearly or variably.

A concentration of a constituent within a layer can vary discretely across the thickness of a layer. For example, an electrically conductive filler can be present in an outer portion of a layer to a certain depth and be absent in the inner portion of the layer.

A concentration of a constituent of a layer composition can vary, for example, linearly, or non-linearly across the thickness or a portion of the thickness of a layer.

A concentration of one or more constituents of a layer can be, for example, greater toward one surface, greater toward both surfaces, or greater toward the center of the layer.

A multilayer system can have any suitable physical structure as appropriate to seal a part intended to be sealed. For example, to seal a two-dimensional continuous surface, a multilayer system can be in the form of a multilayer sheet. To seal a small part, a multilayer system can be in the form of a cap, shell, or any other suitable shape.

Each layer of a multilayer system can independently have a substantially uniform thickness or can have a variable thickness. The thickness of each layer can be substantially the same or can be different than another layer forming a multilayer system. For example, a thickness of a layer can be substantially the same and can be within 10%, within 5%, or within 1% of another layer. For example, a thickness of a layer can be different than the thickness of another layer can differ by more than 10%, for than 20%, more than 50%, or more than 100% the thickness of another layer.

For example, a multilayer system used to seal a two-dimensional continuous surface can include multiple layers with each layer has a substantially uniform thickness and where the thickness of an individual layer may be the same or may be different than the thickness of another layer. For example, a layer having a substantially uniform thickness can have a thickness that does not vary by more than 10%, more than 5%, or by more than 1% across the surface.

A multilayer system can have a total thickness, for example, greater than 2 mm, greater than 4 mm, greater than 6 mm, greater than 8 mm, greater than 10 mm, greater than 12 mm, or greater than 14 mm. A multilayer system can have a total thickness, for example, from 2 mm to 15 mm, from 3 mm to 14 mm, from 3 mm to 12 mm, from 4 mm to 10 mm, or from 6 mm to 8 mm.

Each layer of a multilayer system can independently have a thickness, for example, from 0.1 mm to 25 mm, from 0.5 mm to 25 mm, from 1 mm to 20 mm, from 2 mm to 15 mm, or from 3 mm to 10 mm. Each layer of a multilayer system can independently have a thickness, for example, greater than 0.1 mm, greater than 0.5 mm, greater than 1 mm, greater than 5 mm, greater than 10 mm, greater than 15 mm, or greater than 20 mm. Each layer of a multilayer system can independently have a thickness, for example, less than 25 mm, less than 20 mm, less than 15 mm, less than 10 mm, less than 5 mm, or less than 1 mm.

An outermost layer of a multilayer system can have a thickness that is greater than a thickness of each of the underlying layers, either individually or combined. An outermost layer can have a thickness that is less than a thickness of each of the underlying layers, either individually or combined.

An interior layer can have a thickness that is greater than a thickness of each of the overlying layers, either individually or combined. An interior layer can have a thickness that is less than a thickness of each of the overlying layers, either individually or combined.

For sealing a three-dimensional part, an inner layer can have a variable cross-sectional thickness such as to cover and conform to a complex shape of the part and to provide a smooth, continuous outer surface. Overlying layers can have a substantially uniform thickness.

A multilayer system can be formed by extruding a coreactive sealant composition to form an extrudate and depositing the extrudate onto a substrate or onto a previously deposited layer to form a sealant layer. The previously deposited layer can be a sealant layer or a non-sealant layer. The previously deposited layer can be the outermost layer of a multilayer system. One or more layers can be deposited onto the deposited sealant layer to form a multilayer system.

A multilayer system can be applied to a substrate using additive manufacturing technology such as three-dimensional printing. Additive manufacturing methods facilitate the ability to apply a multilayer system in a consistent and reproducible manner. Furthermore, in part because the temporal constraints associated with manual sealant application methods are avoided, additive manufacturing enables the use of alternative curing chemistries such as fast curing chemistries.

A coreactive sealant composition can comprise a first reactive compound and a second reactive compound, where the first reactive compound is reactive with the second reactive compound. The first and second reactive compounds can react at a temperature less than 50° C., such as less than 40° C., less than 30° C., less than 25° C., less than 20° C., or less than 15° C. The first and second reactive compounds can react in the absence of a catalyst and/or activated polymerization initiator. The first and second reactive compounds can react in the presence of a catalyst or combination of catalysts. The first and second reactive compounds can react in the presence of an activated polymerization initiator such as an activated photoinitiator. The catalyst and polymerization initiator can be suitable for catalyzing or initiating a chemical reaction between the first reactive compound and the second reactive compound.

A coreactive sealant composition can be a thermosetting composition such that the cured coreactive sealant composition can be a thermoset. Each of the layers of a multilayer sealant system can comprise a thermoset.

A coreactive sealant composition con be formed by combining and mixing a first component and a second component. The first component can comprise a first reactive compound and a second reactive compound; and the second component can comprise a catalyst and/or polymerization initiator. The first component can comprise the first reactive compound and the second component can comprise the second reactive compound, and the first and/or second component can comprise a catalyst and/or a polymerization initiator. In addition to a first component and a second component, a coreactive sealant composition can be formed by combining and mixing one or more additional components.

A coreactive sealant composition can be formed, for example, by pumping a first component and a second component into a mixer and mixing the first and second components to form a coreactive sealant composition.

A deposition system can include an in-line static and/or dynamic mixer as well as separate pressurized pumping compartments to hold the at least two components and feed the coreactive components into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the components. The dispensing section can be, for example, a straight tube having any of the above orifice diameters. The length of the dispensing section can be configured to provide a region in which the components can begin to react and build viscosity before being deposited. The length of the dispensing section can be selected, for example, based on the speed of deposition, the rate of reaction of the co-reactants, and the desired viscosity. A coreactive composition can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates. The flow rate can be, for example, from 1 mL/min to 20 mL/min, from 2 mL/min to 15 mL/min, from 3 mL/min to 10 mL/min, or from 4 mL/min to 8 mL/min, through a nozzle having a diameter, for example, from 0.8 mm to 1 mm. In general, a suitable residence time is less than the gel time of a coreactive composition. A suitable gel time can be less than 10 min, less than 8 min, less than 6 min, less than 5 min, less than 4 min, less than 3 min, less than 2 min, or less than 1 min. A gel time of the coreactive composition can be, for example, from 0.5 min to 10 min, from 1 min to 7 min, from 2 min to 6 min, or from 3 min to 5 min.

A coreactive composition for fabricating a multilayer sealant can have a gel time, for example, of less than 12 hours, less than 8 hours, less than 4 hours, less than 1 hour, less than 30 minutes, less than 10 minutes, or less than 1 at 23 C/50% RH. A coreactive composition for fabricating a multilayer sealant can have a gel time, for example, from 10 seconds to 12 hours, from 1 minute to 8 hours, from 30 minutes to 4 hours, or from 1 hour to 3 hours at 23 C/50% RH. A coreactive composition for fabricating a multilayer sealant can have a gel time, for example, of greater than 10 seconds, greater than 1 minute, greater than 30 minutes, greater than 1 hour, greater than 4 hours, or greater than 8 hours. Gel time refers the duration from the time when curing of the coreactive composition is initiated, for example, either by mixing of coreactive components or by exposure to energy such as UV radiation, to when the coreactive composition is no longer stirrable by hand.

A static and/or dynamic mixing nozzle can be heated or cooled to control, for example, the rate of reaction between the coreactive compounds and/or the viscosity of the coreactive composition. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the coreactive compounds.

The one or more additional layers of a multilayer system can be deposited by methods other than extrusion. For example, each layer underlying and/or overlying a sealant layer can be deposited using any suitable method such as by spraying, brushing, roller coating, and/or spreading. Each of the one or more underlying and/or overlying layers can independently comprise a sealant layer or a non-sealant layer.

In addition to a sealant layer of a multilayer system, other layers of the multilayer system can be formed by extruding a suitable coreactive composition. The one or more additional layers can be formed by combining and mixing a first component and a second component to form a coreactive composition comprising a first reactive compound and a second reactive compound. Each of the one or more additional coreactive compositions can be merged with a coreactive sealant composition to form a coextrudate, which can be deposited along with the other layers of the multilayer system. Each of the additional coreactive compositions can independently be selected from an additional coreactive sealant composition or a coreactive non-sealant composition.

The one or more additional layers can be formed by depositing the respective extrudates sequentially. By sequentially depositing means that an extrudate comprising a first coreactive composition is deposited, then a second extrudate comprising a second coreactive composition is deposited and so forth. In this way a multilayer system is built up layer by layer.

Alternatively, one or more of the additional coreactive compositions can be coextruded with the coreactive sealant composition to form a coextrudate, which can then be deposited to simultaneously form all or a portion of the multilayer system. As with the coreactive sealant composition, each of the additional coextruded coreactive compositions can be formed by combining and mixing a first component and a second component to form the respective additional coreactive composition. Each of the additional coreactive compositions can be merged with the flow of the coreactive sealant composition and coextruded through a coextrusion die to form a coextrudate. The coextrudate can be deposited to form a multilayer system in which at least one of the layers is a sealant.

Each of the additional coextruded coreactive compositions can independently comprise a coreactive sealant composition or a coreactive non-sealant composition and the respective layers comprise sealants or non-sealants. Each of the additional coextruded reactive compositions comprises a thermosetting material, which when cured forms a thermoset.

Adjoining coreactive compositions forming the extrudate can comprise the same or different curing chemistries and/or can comprise reactive compounds capable of reacting with reactive compounds in an adjoining coreactive composition. This allows bonding between adjoining coreactive compositions which provides a cured multilayer system in which the adjacent layers are integrally bonded and have a high cohesive strength.

Each coreactive composition of a multilayer system, such as a coreactive sealant composition or a coreactive non-sealant composition, can independently comprise a first compound having a first functional group and a second compound comprising a second functional group, where the first functional group is capable of reacting with the second functional group.

The first and second functional groups can be capable of reacting, for example, at a temperature less than 50° C., less than 40° C., less than 30° C., less than 20 C, or less than 15° C. The first and second functional groups can be capable of reacting, for example, at a temperature from 10° C. to 50° C., from 15° C. to 40° C., or from 20° C. to 30° C. The first and second functional groups can be capable of reacting, for example, at a temperature greater than 10° C., greater than 20° C., greater than 30° C., or greater than 40° C.

A coreactive composition can be a one-part composition in which the curing reaction is initiated upon the application of energy such as by exposing the one-part coreactive composition to actinic radiation such as UV radiation. A coreactive composition can be a two-part composition in which two coreactive components are combined and mixed to initiate the curing reaction. For example, a first coreactive component comprising a first compound comprising a first functional group can be combined and mixed with a second coreactive component comprising a second compound comprising a second functional group to form a coreactive composition, where the first and second functional groups are coreactive. The first and second coreactive components can be combined and mixed before being introduced into the coextruder or can be combined and mixed within the coextruder to form a coreactive composition that is merged with the flow of another coreactive composition.

Properties of the multilayer system and the layers forming the multilayer system such as the viscosity and cure rate of the coreactive compositions, can be selected to facilitate the ability of an extrudate or coextrudate to retain an intended shape following deposition onto a surface.

A coreactive composition can have an initial, as deposited, viscosity, for example, from 1E2 poise to 1E7 poise, from 5E2 poise to 5E6 poise, from 1E3 poise to 1E5 poise, or from 5E3 poise to 5E4 poise, where viscosity is determined using a Brookfield rheometer fitted with a #7 paddle at 2 rpm and 25° C. A coreactive composition can have an initial viscosity, for example, greater than 1E2 poise, greater than 5E2 poise, greater than 1E3 poise, greater than 5E3 poise, greater than 1E4 poise, greater than 1E5 poise, or greater than 1E6 poise. A coreactive composition can have an initial viscosity, for example, less than 1E7 poise, less than 1E6 poise, less than 1E5 poise, less than 1E4 poise, or less than 1E3 poise.

A coreactive composition can have a tack free, for example, of less than 24 hours, less than 10 hours, less than 1 hour, less than 30 minutes, less than 10 minutes or less than 5 minutes at 23° C./50% RH A coreactive composition for fabricating a multilayer sealant can have a tack free time, for example, greater than 10 seconds, greater than 1 minute, greater than 1 hour, greater than 6 hours, or greater than 12 hours at 23° C./50% RH A coreactive composition can have a tack free, for example, from 30 seconds to 24 hours, from 1 minute to 12 hours, from 1 hour to 10 hours, or from 2 hours to 8 hours at 23° C./50% RH. Tack free time" refers to the duration from the time when curing of the coreactive composition is initiated, for example, either by mixing of coreactive components or by exposure to energy such as UV radiation, to the time when a layer prepared from the coreactive composition is no longer tack free, where tack free is determined by applying a polyethylene sheet to the surface of the layer with hand pressure and observing whether sealant adheres to the surface of the polyethylene sheet, where A coreactive composition can have a time to a hardness of Shore 10A, for example, of less than 2 minutes, less than 5 minutes, less than 30 minutes, less than 1 hour, less than 5 hours, less than 10 hours, or less than 20 hours. at 23° C./50% RH. A coreactive composition can have a time to a hardness of Shore 10A, for example, of greater than 30 seconds, greater than 1 minute, greater than 1 hour, greater than 5 hours, or greater than 10 hours at 23° C./50% RH. A coreactive composition can have a time to a hardness of Shore 10A, for example, from 30 seconds to 20 hours, from minute to 12 hours, or from 1 hour to 10 hours, at 23° C./50% RH.

A coreactive composition can have a cure time such as the time to a hardness of Shore 30A of from 1 day to 7 days at 23° C./50% RH.

A coreactive composition can have a long working time and following the end of the working time, can have a fast time to cure. Working time refers to the time from when the coreactive compounds are first combined and mixed to form the coreactive composition until the time the coreactive composition is no longer stirrable by hand; or the time from when a catalyst is added and/or a polymerization initiator is activated to cause the coreactive compounds to react until the time the coreactive composition is no longer stirrable by hand.

Each coreactive composition used to form a multilayer system can independently comprise one or more prepolymers, one or more monomers, and one or more additives.

A coreactive composition can be a thermosetting composition and when cured can form a thermoset.

A coreactive composition can be substantially free of solvent. For example, a coreactive composition can comprise less than 5 wt % solvent, less than 2 wt %, less than 1 wt %, or less than 0.1 wt % solvent, where wt % is based on the total weight of the coreactive composition.

A coreactive composition can comprise coreactive compounds that coreact and cure at room temperature, where room temperature refers to a temperature from 20° C. to 25° C., from 20° C. to 22° C., or about 20° C.

A prepolymer can comprise any suitable backbone. A prepolymer backbone can be selected, for example, based on the end use requirements of a multilayer system and the desired attributes of a particular layer.

A coreactive composition can comprise a prepolymer or combination of prepolymers. Prepolymers can influence, for example, the tensile strength, % elongation, hydrolytic stability, and/or chemical resistance, as well as other properties of the cured sealant.

A prepolymer can have a number average molecular weight, for example, less than 20,000 Da, less than 15,000 Da, less than 10,000 Da, less than 8,000 Da, less than 6,000 Da, less than 4,000 Da, or less than 2,000 Da. A prepolymer can have a number average molecular weight, for example, greater than 2,000 Da, greater than 4,000 Da, greater than 6,000 Da, greater than 8,000 Da, greater than 10,000 Da, or greater than 15,000 Da. A prepolymer can have a number average molecular weight, for example, from 1,000 Da to 20,000 Da, from 2,000 Da to 10,000 Da, from 3,000 Da to 9,000 Da, from 4,000 Da to 8,000 Da, or from 5,000 Da to 7,000 Da.

A prepolymer can be liquid at 25° C. and can have a glass transition temperature Tg, for example, less than −20° C., less than −30° C., or less than −40° C.

A prepolymer can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

A prepolymer can have a reactive functionality, for example, less than 12, less than 10, less than 8, less than 6, or less than 4. Each of the first reactive compound and the second reactive compound can comprise a prepolymer having respective reactive functionality, for example, from 2 to 12, from 2 to 8, from 2 to 6, from 2 to 4, or from 2 to 3. Each of the first reactive compound and the second reactive compound can independently have a functionality, for example, of 2, 3, 4, 5, or 6.

A coreactive composition can comprise a prepolymer or combination of prepolymers having any suitable polymeric backbone. A polymeric backbone can be selected, for example, to impart solvent resistance to the cured coreactive composition, to impart desired physical properties such as tensile strength, % elongation, Young's modulus, impact resistance, or other application-relevant property. A prepolymer backbone can be terminated in one or more suitable functional groups as appropriate for a particular curing chemistry.

A prepolymer can comprise segments having different chemical structure and properties within the prepolymer backbone. The segments can be distributed randomly, in a regular distribution, or in blocks. The segments can be used to impart certain properties to the prepolymer backbone. For example, the segments can comprise flexible linkages such as thioether linkages into the polymer backbone. Segments having pendent groups can be incorporated into the prepolymer backbone.

For example, a prepolymer backbone can comprise a polythioether, a polysulfide, a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and copolymer of butene, homo- and copolymers of hexene; and combinations of any of the foregoing.

Examples of other suitable prepolymer backbones include polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly (methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polycarbonates (PC), polyamides, polyesters, liquid crystalline polymers (LCPs), poly(lactic acid), poly(phenylene oxide) (PPO), PPO-polyamide alloys, polysulfone (PSU), polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), polyurethanes (thermoplastic and thermosetting), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly (dimethylsiloxane)), elastomers, epoxy polymers, polyureas, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly (ethylene oxide)s (also known as poly(ethylene glycol)s, poly(propylene oxide)s (also known as poly(propylene glycol)s, and ethylene oxide/propylene oxide copolymers, acrylic latex polymers, polyester acrylate oligomers and polymers, polyester diol diacrylate polymers, and UV-curable resins.

A coreactive composition can comprise a prepolymer comprising an elastomeric backbone. "Elastomer," "elastomeric" and similar terms refer to materials with "rubber-like" properties and generally having a low Young's modulus and a high tensile strain. For example, elastomers can have a Young's modulus/tensile strength from about 4 MPa to about 30 MPa. Elastomers can have a tensile strain (elongation at break) from about 100% to about 2,000%. The Young's modulus/tensile strength and tensile strain can be determined according to ASTM D412.4893. Elastomers can exhibit a tear strength, for example, from 50 kN/m to 200 kN/m. Tear strength of an elastomer can be determined according to ASTM D624. The Young's modulus of an elastomer can range from 0.5 MPa to 6 MPa as determined according to ASTM D412.4893.

Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, chlorosulfonated polyethylene rubbers, isoprenes, neoprenes, polysulfides, polythioethers, silicones, styrene butadienes, and combinations of any of the foregoing. An elastomeric prepolymer can comprise a polysiloxane, such as, for example, a polymethylhydrosiloxane, polydimethylsiloxane, polyhydrodiethylsiloxane, polydiethylsiloxane, or a combination of any of the foregoing. The elastomeric prepolymer can comprise terminal functional groups that have a low reactivity with amine and isocyanate groups such as silanol groups.

Examples of prepolymers that exhibit high solvent resistance include fluoropolymers, ethylene propylene diene terpolymer (EPDM), and other chemically resistant prepolymers disclosed herein, cured polymeric matrices having a high crosslinking density, chemically resistant organic filler such as polyamides, polyphenylene sulfides, and polyethylenes, or a combination of any of the foregoing.

Examples of prepolymers having a chemically resistant backbone include polytetrafluorethylene, polyvinylidene difluoride, polyethylenetetrafluoroethylene, fluorinated ethylene propylene, perfluoroalkoxy, ethylene chlorotrifluoroethylene, polychlorotrifluoroethylene, fluorinated ethylene propylene polymers polyamide, polyethylene, polypropylene, ethylene-propylene, fluorinated ethylene-propylene, polysulfone, polyarylether sulfone, polyether sulfone, polyimide, polyethylene terephthalate, polyetherketone, polyetherether ketone, polyetherimide, polyphenylene sulfide, polyarylsulfone, polybenzimidazole, polyamideimide, liquid crystal polymers, and combinations of any of the foregoing.

Examples of prepolymers that exhibit low temperature flexibility include silicones, polytetrafluoroethylenes, polythioethers, polysulfides, polyformals, polybutadienes, certain elastomers, and combinations of any of the foregoing.

Examples of prepolymers that exhibit hydrolytic stability include silicones, polytetrafluoroethylenes, polythioethers, polysulfides, polyformals, polybutadienes, certain elastomers, and combinations of any of the foregoing, and compositions having a high crosslinking density.

Examples of prepolymers that exhibit high temperature resistance can comprise, for example, prepolymers such as silicones, polytetrafluoroethylenes, polythioethers, polysulfides, polyformals, polybutadienes, certain elastomer, and combinations of any of the foregoing; and compositions having a high crosslinking density.

Examples of prepolymers that exhibit high tensile include silicones and polybutadiene, compositions having high crosslinking density, inorganic filler, and combinations of any of the foregoing.

A coreactive sealant composition can comprise a sulfur-containing prepolymer or combination of sulfur-containing prepolymers. Sulfur-containing monomers and prepolymers can impart solvent resistance to a cured sealant.

For applications where chemical resistance is required, prepolymers having a sulfur-containing backbone can be used. The chemical resistance can be with respect to cleaning solvents, fuels, hydraulic fluids, lubricants, oils, and/or salt spray. Chemical resistance refers to the ability of a part to maintain acceptable physical and mechanical properties following exposure to atmospheric conditions such as moisture and temperature and following exposure to chemicals such as cleaning solvents, fuels, hydraulic fluid, lubricants, and/or oils. In general, a chemically resistant part has exhibits a % swell less than 25%, less than 20%, less than 15%, or less than 10%, following immersion in a chemical for 7 days at 70° C., where % swell is determined according to EN ISO 10563.

A sulfur-containing prepolymer refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure of HS—R—R(—$CH_2$—SH)—[—R—($CH_2$)$_2$—S(O)$_2$—($CH_2$)—S(O)$_2$]$_n$—CH=$CH_2$ where each R is a moiety that does not contain a sulfur atom in the prepolymer backbone, is not encompassed by a sulfur-containing prepolymer. A prepolymer having the structure HS—R—R(—$CH_2$—SH)—[—R—($CH_2$)$_2$—S(O)$_2$—($CH_2$)—S(O)$_2$]—CH=$CH_2$ where at least one R is a moiety that contains a sulfur atom, such as a thioether group, is encompassed by a sulfur-containing prepolymer.

Sulfur-containing prepolymers having a high sulfur content can impart chemical resistance to a cured coreactive composition. For example, a sulfur-containing prepolymer backbone can have a sulfur content greater than 10 wt %, greater than 12 wt %, greater than 15 wt %, greater than 18 wt %, greater than 20 wt %, or greater than 25 wt %, where wt % is based on the total weight of the prepolymer backbone. A chemically resistant prepolymer backbone can have a sulfur content, for example, from 10 wt % to 25 wt %, from 12 wt % to 23 wt %, from 13 wt % to 20 wt %, or from 14 wt % to 18 wt %, where wt % is based on the total weight of the prepolymer backbone. Sulfur content can be determined according to ASTM D297.

Examples of prepolymers having a sulfur-containing backbone include polythioether prepolymers, polysulfide prepolymers, sulfur-containing polyformal prepolymers, monosulfide prepolymers, and a combination of any of the foregoing.

A coreactive sealant composition can comprise, for example, from 40 wt % to 80 wt %, from 40 wt % to 75 wt %, from 45 wt % to 70 wt %, or from 50 wt % to 70 wt % of a sulfur-containing prepolymer or combination of sulfur-containing prepolymers, where wt % is based on the total weight of the coreactive composition. A coreactive sealant composition can comprise, for example, greater than 40 wt %, greater than 50 wt %, greater than 60 wt %, greater than 70 wt %, greater than 80 wt %, or greater than 90 wt % of a sulfur-containing prepolymer or combination of sulfur-containing prepolymer, where wt % is based on the total weight of the coreactive sealant composition. A coreactive sealant composition can comprise, for example, less than 90 wt %, less than 80 wt %, less than 70 wt %, less than 60 wt %, less than 50 wt %, or less than 40 wt % of a sulfur-containing prepolymer or combination of sulfur-containing prepolymers, where wt % is based on the total weight of the coreactive sealant composition.

A coreactive sealant composition for forming a cured sealant layer that exhibits fuel resistance can comprise, for example, prepolymers having a sulfur content greater than 10 wt %, where wt % is based on the total weight of the prepolymer, rubber such as polybutadiene and ethylene propylene diene terpolymer (EPDM), a high crosslinking density, chemically resistant organic filler such as polyamides, polyphenylene sulfides, and polyethylenes, or a combination of any of the foregoing.

A sulfur-containing prepolymer can comprise a polythioether prepolymer or a combination of polythioether prepolymers.

A polythioether prepolymer can comprise a polythioether prepolymer comprising at least one moiety having the structure of Formula (1), a thiol terminated polythioether prepolymer of Formula (1a), a terminal-modified polythioether of Formula (1b), or a combination of any of the foregoing:

—S—R$^1$—[S-A-S—R$^1$—]$_n$—S—  (1)

HS—R$^1$—[S-A-S—R$^1$—]$_n$—SH  (1a)

R$^3$—S—R$^1$—[S-A-S—R$^1$—]$_n$—S—R$^3$  (1b)

wherein,
n can be an integer from 1 to 60;
each R$^1$ can independently be selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR)$_p$—X—]$_q$(CHR)$_r$—, where,
p can be an integer from 2 to 6;
q can be an integer from 1 to 5;
r can be an integer from 2 to 10;
each R can independently be selected from hydrogen and methyl; and
each X can independently be selected from O, S, and S—S; and
each A can independently be a moiety derived from a polyvinyl ether of Formula (2) or a polyalkenyl polyfunctionalizing agent of Formula (3):

CH$_2$=CH—O—(R$^2$—O)$_m$—CH=CH$_2$  (2)

B(—R$^4$—CH=CH$_2$)$_z$  (3)

wherein,
m can be an integer from 0 to 50;
each R$^2$ can independently be selected from C$_{1-10}$ alkanediyl, C$_{6-8}$ cycloalkanediyl, C$_{6-14}$ alkanecycloalkanediyl, and —[(CHR)$_p$—X—]$_q$(CHR)$_r$—, wherein p, q, r, R, and X are as defined as for R$^1$;
B represents a core of a z-valent, polyalkenyl polyfunctionalizing agent B(—R$^4$—CH=CH$_2$)$_z$ wherein,
z can be an integer from 3 to 6;
each R$^4$ can independently be selected from C$_{1-10}$ alkanediyl, C$_{1-10}$ heteroalkanediyl, substituted C$_{1-10}$ alkanediyl, and substituted C$_{1-10}$ heteroalkanediyl; and
each R$^3$ can independently be moiety comprising a terminal reactive group;

In moieties of Formula (1) and prepolymers of Formula (1a) and (1b), R$^1$ can be C$_{2-10}$ alkanediyl.

In moieties of Formula (1) and prepolymers of Formula (1a) and (1b), R$^1$ can be —[(CHR)$_p$—X—]$_q$(CHR)$_r$—.

In moieties of Formula (1) and prepolymers of Formula (1a) and (1b), X can be selected from O and S, and thus —[(CHR)$_p$—X—]$_q$(CHR)$_r$— can be —[(CHR)$_p$—O—]$_q$(CHR)$_r$— or —[(CHR)$_p$—S—]$_q$(CHR)$_r$—. P and r can be equal, such as where p and r can both be two.

In moieties of Formula (1) and prepolymers of Formula (1a) and (1b), R$^1$ can be selected from C$_{2-6}$ alkanediyl and —[(CHR)$_p$—X—]$_q$(CHR)$_r$—.

In moieties of Formula (1) and prepolymers of Formula (1a) and (1b), R$^1$ can be —[(CHR)$_p$—X—]$_q$(CHR)$_r$—, and X can be O, or X can be S.

In moieties of Formula (1) and prepolymers of Formula (1a) and (1b), where R$^1$ can be —[(CHR)$_p$—X—]$_q$(CHR)$_r$—, p can be 2, r can be 2, q can be 1, and X can be S; or p can be 2, q can be 2, r can be 2, and X can be O; or p can be 2, r can be 2, q can be 1, and X can be O.

In moieties of Formula (1) and prepolymers of Formula (1a) and (1b), R$^1$ can be —[(CHR)$_p$—X—]$_q$(CHR)$_r$—, each R can be hydrogen, or at least one R can be methyl.

In moieties of Formula (1) and prepolymers of Formula (1a) and (1b), R$^1$ can be —[(CH$_2$)$_p$—X—]$_q$(CH$_2$)$_r$— wherein each X can independently be selected from O and S.

In moieties of Formula (1) and prepolymers of Formula (1a) and (1b), R$^1$ can be —[(CH$_2$)$_p$—X—]$_q$(CH$_2$)$_r$— wherein each X can be O or each X can be S.

In moieties of Formula (1) and prepolymers of Formula (1a) and (1b), R$^1$ can be —[(CH$_2$)$_p$—X—]$_q$(CH$_2$)$_r$—, where p can be 2, X can be 0, q can be 2, r can be 2, R$^2$ can be ethanediyl, m can be 2, and n can be 9.

In moieties of Formula (1) and prepolymers of Formula (1a) and (1b), each R$^1$ can be derived from 1,8-dimercapto-3,6-dioxaoctane (DMDO; 2,2-(ethane-1,2-diylbis(sulfanyl)) bis(ethan-1-thiol)), or each R$^1$ can be derived from dimercaptodiethylsulfide (DMDS; 2,2'-thiobis(ethan-1-thiol)), and combinations thereof.

In moieties of Formula (1) and prepolymers of Formula (1a) and (1b), each p can independently be selected from 2, 3, 4, 5, and 6. Each p can be the same and can be 2, 3, 4, 5, or 6.

In moieties of Formula (1) and prepolymers of Formula (1a) and (1b), each q can independently be 1, 2, 3, 4, or 5. Each q can be the same and can be 1, 2, 3, 4, or 5.

In moieties of Formula (1) and prepolymers of Formula (1a) and (1b), each r can independently be 2, 3, 4, 5, 6, 7, 8, 9, or 10. Each r can be the same and can be 2, 3, 4, 5, 6, 7, 8, 9, or 10.

In moieties of Formula (1) and prepolymers of Formula (1a) and (1b), each r can independently be an integer from 2 to 4, from 2 to 6, or from 2 to 8.

In divinyl ethers of Formula (2), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (2), each R$^2$ can independently be selected from a C$_{2-10}$ n-alkanediyl group, a C$_{3-6}$ branched alkanediyl group, and a —[(CH$_2$)$_p$—X—]$_q$(CH$_2$)$_r$— group.

In divinyl ethers of Formula (2), each R$^2$ can independently be a C$_{2-10}$ n-alkanediyl group, such as methanediyl, ethanediyl, n-propanediyl, or n-butanediyl.

In divinyl ethers of Formula (2), each $R^2$ can independently comprise a —[(CH$_2$)$_p$—X—]$_q$(CH$_2$)$_r$— group, where each X can be O or S.

In divinyl ethers of Formula (2), each $R^2$ can independently comprise a —[(CH$_2$)$_p$—X—]$_q$(CH$_2$)$_r$— group.

In divinyl ethers of Formula (2), each m can be independently an integer from 1 to 3. Each m can be the same and can be 1, 2, or 3.

In divinyl ethers of Formula (2), each $R^2$ can independently be selected from a $C_{2-10}$ n-alkanediyl group, a $C_{3-6}$ branched alkanediyl group, and a —[(CH$_2$)$_p$—X—]$_q$ (CH$_2$)$_r$— group.

In divinyl ethers of Formula (2), each $R^2$ can independently be a $C_{2-10}$ n-alkanediyl group.

In divinyl ethers of Formula (2), each $R^2$ can independently be a —[(CH$_2$)$_p$—X—]$_q$(CH$_2$)$_r$— group, where each X can be O or S.

In divinyl ethers of Formula (2), each $R^2$ can independently be a —[(CH$_2$)$_p$—X—]$_q$(CH$_2$)$_r$— group, where each X can be O or S, and each p can independently be 2, 3, 4, 5, and 6.

In divinyl ethers of Formula (2), each p can be the same and can be 2, 3, 4, 5, or 6.

In divinyl ethers of Formula (2), each $R^2$ can independently be a —[(CH$_2$)$_p$—X—]$_q$(CH$_2$)$_r$— group, where each X can be O or S, and each q can independently be 1, 2, 3, 4, or 5.

In divinyl ethers of Formula (2), each q can be the same and can be 1, 2, 3, 4, or 5.

In divinyl ethers of Formula (2), each $R^2$ can independently be a —[(CH$_2$)$_p$—X—]$_q$(CH$_2$)$_r$— group, where each X can be O or S, and each r can independently be 2, 3, 4, 5, 6, 7, 8, 9, or 10.

In divinyl ethers of Formula (2), each r can be the same and can be 2, 3, 4, 5, 6, 7, 8, 9, or 10. In divinyl ethers of Formula (2), each r can independently be an integer from 2 to 4, from 2 to 6, or from 2 to 8.

Examples of suitable divinyl ethers include ethylene glycol divinyl ether (EG-DVE), butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (1) each A can independently be derived from a polyalkenyl polyfunctionalizing agent. A polyalkenyl polyfunctionalizing agent can have the structure of Formula (3), where z can be 3, 4, 5, or 6.

In polyalkenyl polyfunctionalizing agents of Formula (3), each $R^4$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3,5-triallyl-1,3,5-triazinane-2,4,6-trione), 1,3-bis(2-methylallyl)-6-methylene-5-(2-oxopropyl)-1,3,5-triazinone-2,4-di-one, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (1) and prepolymers of Formula (1a)-(1b), the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (1) and prepolymers of Formula (1a)-(1b), each $R^1$ can be —(CH$_2$)$_2$—O—(CH$_2$)$_2$—O—(CH$_2$)$_2$—; each $R^2$ can be —(CH$_2$)$_2$—; and m can be an integer from 1 to 4.

In moieties of Formula (1) and prepolymers of Formula (1a)-(1b), each $R^2$ can be derived from a divinyl ether such a diethylene glycol divinyl ether, a polyalkenyl polyfunctionalizing agent such as triallyl cyanurate, or a combination thereof.

In moieties of Formula (1) and prepolymers of Formula (1a)-(1b), each A can independently be selected from a moiety of Formula (2a) and a moiety of Formula (3a):

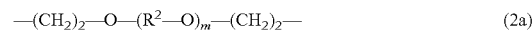

$$—(CH_2)_2—O—(R^2—O)_m—(CH_2)_2— \quad (2a)$$

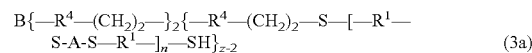

$$B\{—R^4—(CH_2)_2—\}_2\{—R^4—(CH_2)_2—S—[—R^1—S-A-S—R^1—]_n—SH\}_{z-2} \quad (3a)$$

where m, $R^1$, $R^2$, $R^4$, A, B, m, n, and z are defined as in Formula (1), Formula (2), and Formula (3).

In moieties of Formula (1) and prepolymers of Formula (1a)-(1b), each $R^1$ can be (CH$_2$)$_2$—O—(CH$_2$)$_2$—O—(CH$_2$)$_2$—; each $R^2$ can be —(CH$_2$)$_2$—; m can be an integer from 1 to 4; and the polyfunctionalizing agent B(—$R^4$—CH=CH$_2$)$_z$ comprises triallyl cyanurate where z is 3 and each $R^4$ can be —O—CH$_2$—CH=CH$_2$.

Methods of synthesizing sulfur-containing polythioethers are disclosed, for example, in U.S. Pat. No. 6,172,179.

The backbone of a thiol-terminated polythioether prepolymer can be modified to increase one or more properties such as adhesion, tensile strength, elongation, UV resistance, hardness, and/or flexibility of sealants prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl) alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing), each of which is incorporated by reference in its entirety. Polythioether prepolymers include prepolymers described in U.S. Application Publication Nos. 2017/0369737 and 2016/0090507.

Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (1), (1a), and (1b). Thiol terminated polythioethers include prepolymers described in U.S. Pat. No. 7,390,859 and urethane-containing polythiols described in U.S. Application Publication Nos. 2017/0369757 and 2016/0090507.

A sulfur-containing prepolymer can comprise a polysulfide prepolymer or a combination of polysulfide prepolymers.

A polysulfide prepolymer refers to a prepolymer that contains one or more polysulfide linkages, i.e., $—S_x—$ linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel. Suitable thiol-terminated polysulfide prepolymers such as Thioplast® G resins are liquid thiol-terminated polysulfide prepolymers that are blends of di- and tri-functional molecules where the difunctional thiol-terminated polysulfide prepolymers have the structure of Formula (4) and the trifunctional thiol-terminated polysulfide polymers can have the structure of Formula (5):

$$HS—(—R^5—S—S—)_n—R^5—SH \quad (4)$$

$$HS—(—R^5—S—S—)_n—CH_2—CH\{—CH_2—(—S—S—R^5—)_b—SH\}\{—(—S—S—R^5—)_c—SH\} \quad (5)$$

where each $R^5$ is $(CH_2)_2—O—CH_2—O—(CH_2)_2—$, and n=a+b+c, where the value for n may be from 7 to 38 depending on the amount of the trifunctional cross-linking agent (1,2,3-trichloropropane; TCP) used during synthesis of the polysulfide prepolymer. Thioplast® G polysulfides can have a number average molecular weight from less than 1,000 Da to 6,500 Da, a SH content from 1 wt % to greater than 5.5 wt %, and a cross-linking density from 0 wt % to 2.0 wt %.

A polysulfide prepolymer can further comprise a terminal-modified polysulfide prepolymer having the structure of Formula (4a), a terminal-modified polysulfide prepolymer having the structure of Formula (5a), or a combination thereof:

$$R^3—S—(—R^5—S—S—)_n—R^5—S—R^3 \quad (4a)$$

$$R^3—S—(—R^5—S—S—)_a—CH_2—CH\{—CH_2—(—S—S—R^5—)_b—S—\}\{—(—S—S—R^5—)_c—S—R^3\} \quad (5a)$$

where n, a, b, c, and $R^5$ are defined as for Formula (4) and Formula (5), and $R^3$ is a moiety comprising a terminal reactive group.

Examples of suitable thiol-terminated polysulfide prepolymers also include Thiokol® LP polysulfides available from Toray Industries, Inc. such as Thiokol® LP2, Thiokol® LP3, Thiokol® LP12, Thiokol® LP23, Thiokol® LP33, and Thiokol® LP55. Thiokol® LP polysulfides have a number average molecular weight from 1,000 Da to 7,500 Da, a SH content from 0.8% to 7.7%, and a cross-linking density from 0% to 2%. Thiokol® LP polysulfide prepolymers have the structure of Formula (6) and terminal-modified polysulfide prepolymers can have the structure of Formula (6a):

$$HS—[(CH_2)_2—O—CH_2—O—(CH_2)_2—S—S—]_n— (CH_2)_2—O—CH_2—O—(CH_2)_2—SH \quad (6)$$

$$R^3—S—[(CH_2)_2—O—CH_2—O—(CH_2)_2—S—S—]_n—(CH_2)_2—O—CH_2—O—(CH_2)_2—S—R^3 \quad (6a)$$

where n can be such that the number average molecular weight from 1,000 Da to 7,500 Da, such as, for example an integer from 8 to 80, and each $R^3$ is a moiety comprising a terminal reactive functional group.

A thiol-terminated sulfur-containing prepolymer can comprise a Thiokol-LP® polysulfide, a Thioplast® G polysulfide, or a combination thereof.

A polysulfide prepolymer can comprise a polysulfide prepolymer comprising a moiety of Formula (7), a thiol terminated polysulfide prepolymer of Formula (7a), a terminal-modified polysulfide prepolymer of Formula (7b), or a combination of any of the foregoing:

$$—R^6—(S_y—R^6)_t— \quad (7)$$

$$HS—R^6—(S_y—R^6)_t—SH \quad (7a)$$

$$R^3—S—R^6—(S_y—R^6)_t—S—R^3 \quad (7b)$$

where,
  t can be an integer from 1 to 60;
  each $R^6$ can independently be selected from branched alkanediyl, branched arenediyl, and a moiety having the structure $—(CH_2)_p—O—(CH_2)_q—O—(CH_2)_r—$;
  q can be an integer from 1 to 8;
  p can be an integer from 1 to 10;
  r can be an integer from 1 to 10;
  y can have an average value within a range from 1.0 to 1.5; and
  each $R^3$ is a moiety comprising a terminal reactive functional group.

In moieties of Formula (7) and prepolymers of Formula (7a)-(7b), 0% to 20% of the $R^6$ groups can comprise branched alkanediyl or branched arenediyl, and 80% to 100% of the $R^6$ groups can be $—(CH_2)_p—O—(CH_2)_q—O—(CH_2)_r—$.

In moieties of Formula (7) and prepolymers of Formula (7a)-(7b), a branched alkanediyl or a branched arenediyl can be $—R(-A)_n—$ where R is a hydrocarbon group, n is 1 or 2, and A is a branching point. A branched alkanediyl can have the structure $—CH_2(—CH(—CH_2—)—)—$.

Examples of thiol terminated polysulfide prepolymers of Formula (7a) and (7b) are disclosed, for example, in U.S. Application Publication No. 2016/0152775, in U.S. Pat. No. 9,079,833, and in U.S. Pat. No. 9,663,619.

A polysulfide prepolymer can comprise a polysulfide prepolymer comprising a moiety of Formula (8), a thiol terminated polysulfide prepolymer of Formula (8a), a terminal-modified polysulfide prepolymer of Formula (8b), or a combination of any of the foregoing:

$$—(R^7—O—CH_2—O—R^7—S_m—)_{n-1}—R^7—O—CH_2—O—R^7— \quad (8)$$

$$HS—(R^7—O—CH_2—O—R^7—S_m—)_{n-1}—R^7—O—CH_2—O—R^7—SH \quad (8a)$$

$$R^3—S—(R^7—O—CH_2—O—R^7—S_m—)_{n-1}—R^7—O—CH_2—O—R^7—S—R^3 \quad (8b)$$

where $R^7$ is $C_{2-4}$ alkanediyl, m is an integer from 2 to 8, and n is an integer from 2 to 370; and each $R^3$ is independently a moiety comprising a terminal reactive functional group.

Moieties of Formula (8) and prepolymers of Formula (8a)-(8b), are disclosed, for example, in JP 62-53354.

A sulfur-containing prepolymer can comprise a sulfur-containing polyformal prepolymer or a combination of sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A sulfur-containing polyformal prepolymer can comprise a moiety of Formula (9), a thiol-terminated sulfur-containing polyformal prepolymer of Formula (9a), a terminal-modified sulfur-containing polyformal prepolymer of Formula (9b), a thiol-terminated sulfur-containing polyformal prepolymer of Formula (9c), a terminal-modified sulfur-containing polyformal prepolymer of Formula (9d), or a combination of any of the foregoing:

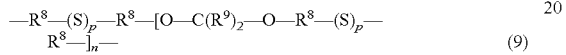  (9)

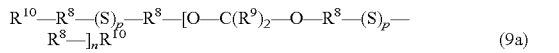  (9a)

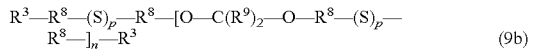  (9b)

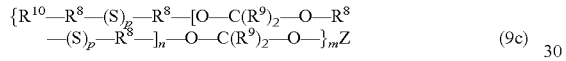  (9c)

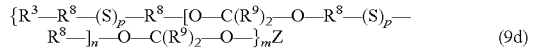  (9d)

where n can be an integer from 1 to 50; each p can independently be selected from 1 and 2; each $R^8$ can be $C_{2-6}$ alkanediyl; and each $R^9$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^{10}$ is a moiety comprising a terminal thiol group; and each $R^3$ is independently a moiety comprising a terminal reactive functional group other than a thiol group; and Z can be derived from the core of an m-valent parent polyol $Z(OH)_m$.

A sulfur-containing prepolymer can comprise a monosulfide prepolymer or a combination of monosulfide prepolymers.

A monosulfide prepolymer can comprise a moiety of Formula (10), a thiol-terminated monosulfide prepolymer of Formula (10a), a thiol terminated monosulfide prepolymer of Formula (10b), a terminal-modified monosulfide prepolymer of Formula (10c), a terminal-modified monosulfide prepolymer of Formula (10d), or a combination of any of the foregoing:

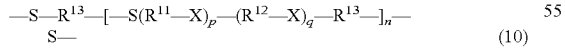  (10)

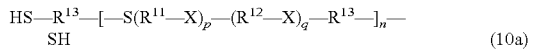  (10a)

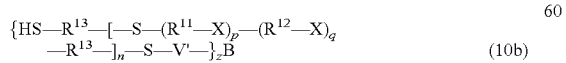  (10b)

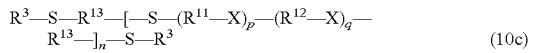  (10c)

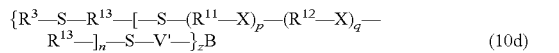  (10d)

wherein, each $R^{11}$ can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^{12}$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^{13}$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35;

each $R^3$ is independently selected from a reactive functional group;

B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol.

Methods of synthesizing thiol terminated monosulfide comprising moieties of Formula (10) or prepolymers of Formula (10b)-(10c) are disclosed, for example, in U.S. Pat. No. 7,875,666.

A monosulfide prepolymer can comprise a moiety of Formula (11), a thiol-terminated monosulfide prepolymer comprising a moiety of Formula (11a), comprise a thiol terminated monosulfide prepolymer of Formula (11b), a thiol-terminated monosulfide prepolymer of Formula (11c), a thiol-terminated monosulfide prepolymer of Formula (11d), or a combination of any of the foregoing:

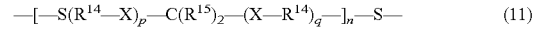  (11)

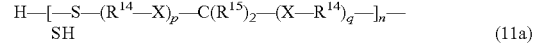  (11a)

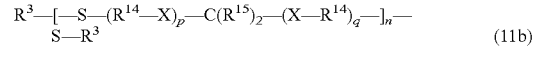  (11b)

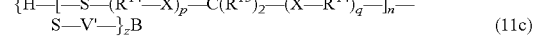  (11c)

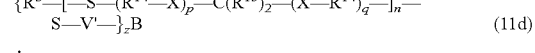  (11d)

wherein, each $R^H$ can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^{15}$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;

each X can independently be selected from O and S;

p can be an integer from 1 to 5;

q can be an integer from 1 to 5;

n can be an integer from 1 to 60, such as from 2 to 60, from 3 to 60, or from 25 to 35;

each $R^3$ is a moiety comprising a terminal functional group;

B represents a core of a z-valent polyfunctionalizing agent $B(-V)_z$ wherein:
z can be an integer from 3 to 6; and
each V can be a moiety comprising a terminal group reactive with a thiol group;
each —V'— can be derived from the reaction of —V with a thiol.

Methods of synthesizing monosulfides of Formula (11)-(11d) are disclosed, for example, in U.S. Pat. No. 8,466,220.

A prepolymer can comprise a terminal-modified prepolymer such as a terminal-modified sulfur-containing prepolymer. Terminal-modified sulfur-containing prepolymers refer to sulfur-containing prepolymers comprising terminal reactive functional groups other than thiol groups.

A terminal reactive functional group such as $R^3$ can be selected from, for example, an alkenyl, alkynyl, epoxy, isocyanate, hydroxyl, amine, Michael acceptor, Michael donor, or another reactive functional group. A terminal-modified sulfur-containing prepolymer can be prepared, for example, by reacting a thiol-terminated sulfur-containing prepolymer with a compound comprising a terminal functional group and a group reactive with a thiol group.

Examples of suitable groups reactive with thiol groups include alkenyl groups, alkynyl groups, epoxy groups, Michael acceptor groups, and isocyanate groups.

For example, an alkenyl-terminated sulfur-containing prepolymer can be prepared by reacting a polyalkenyl compound with a thiol-terminated sulfur-containing prepolymer, an epoxy-terminated sulfur-containing prepolymer can be prepared by reacting a polyepoxide with a thiol-terminated sulfur-containing prepolymer, an isocyanate-terminated sulfur-containing prepolymer can be prepared by reacting a polyisocyanate with a thiol-terminated sulfur-containing prepolymer, and a Michael acceptor-terminated sulfur-containing prepolymer can be prepared by reacting a polyfunctional Michael acceptor with a thiol-terminated sulfur-containing prepolymer.

A coreactive composition can comprise a reactive monomer or a combination of reactive monomers. A coreactive monomer can comprise functional groups reactive with a prepolymer and/or another monomer.

A reactive monomer can have a molecular weight, for example, less than 1,000 Da, less than 800 Da less than 600 Da, less than 500 Da, less than 400 Da, or less than 300 Da. A monomer can have a molecular weight, for example, from 100 Da to 1,000 Da, from 100 Da to 800 Da, from 100 Da to 600 Da, from 150 Da, to 550 Da, or from 200 Da to 500 Da. A monomer can have a molecular weight greater than 100 Da, greater than 200 Da, greater than 300 Da, greater than 400 Da, greater than 500 Da, greater than 600 Da, or greater than 800 Da.

A reactive monomer can have a reactive functionality of two or more, for example, from 2 to 6, from 2 to 5, or from 2 to 4. A reactive monomer can have a functionality of 2, 3, 4, 5, or 6. A reactive monomer can have an average reactive functionality, for example, from 2 to 6, from 2 to 5, from 2 to 4, from 2 to 3, from 2.1 to 2.8, or from 2.2 to 2.6.

A reactive monomer can comprise any suitable functional group such as, for example, a thiol, alkenyl, alkynyl, epoxy, isocyanate, Michael acceptor, Michael donor, hydroxyl, amine, silanol, polyalkoxysilyl, or other suitable reactive functional group.

A reactive monomer can comprise, for example, a polythiol, a polyalkenyl, a polyalkynyl, a polyepoxide, a polyfunctional Michael acceptor, a polyfunctional Michael donor, a polyisocyanate, a polyol, a polyamine, a polyfunctional silanol, a polyfunctional polyalkoxysilyl, or a combination of any of the foregoing.

A monomer can comprise a sulfur-containing monomer.

A sulfur-containing monomer can have a sulfur content, for example, from 0 wt % to 80 wt %, from 2 wt % to 75 wt %, from 5 wt % to 70 wt %, from 10 wt % to 65 wt %, from 15 wt % to 60 wt %, or from 20 wt % to 50 wt %%, where wt % is based on the total molecular weight of the monomer. A monomer can have a sulfur content, for example, greater than 0 wt %, greater than 10 wt %, greater than greater than 20 wt %, greater than 30 wt %, greater than 40 wt %, greater than 50 wt %, greater than 60 wt %, greater than 70 wt % or greater than 80 wt %, where wt % is based on the total molecular weight of the monomer. A monomer can have a sulfur content, for example, less than 80 wt %, less than 70 wt %, less than 60 wt %, less than 50 wt %, less than 40 wt %, less than 30 wt %, less than 20 wt %, less than 10 wt %, or less than 5 wt %, where wt % is based on the total molecular weight of the monomer.

A reactive monomer can comprise a polyfunctionalizing agent or a combination of polyfunctionalizing agents.

Polyfunctionalizing agents can have a functionality of three or more functional groups that can be included in a composition to increase the cross-linking density of a cured polymer matrix. A polyfunctionalizing agent can comprise functional groups reactive with reactive prepolymers and/or reactive monomers.

A polyfunctionalizing agent can comprise an average functionality, for example, from 3 to 6, such as from 3 to 5, or from 3 to 4. A polyfunctionalizing agent can have a functionality of 3, 4, 5, or 6.

A polyfunctionalizing agent can comprise, for example, a polythiol, a polyalkenyl, a polyalkynyl, a polyepoxide, a polyfunctional Michael acceptor, a polyfunctional Michael donor, a polyisocyanate, a polyol, a polyamine, a polyfunctional silanol, a polyfunctional polyalkoxysilyl, or a combination of any of the foregoing.

Each of a first reactive compound and a second reactive compound can independently comprise at least two first functional groups and the second compound can comprise at least two second functional groups, where the second functional groups are reactive with the first functional groups.

For example, the first functional group can be a thiol group, and the second functional group can be an alkenyl group, an alkynyl group, an epoxy group, a Michael acceptor group, an isocyanate group, or a combination of any of the foregoing.

The particular functional groups and curing chemistries can be selected to provide a desired curing rate and/or to impart a desired property to a cured layer of a multilayer system.

Examples of useful curing chemistries include hydroxyl/isocyanate, amine/isocyanate, epoxy/epoxy, and Michael acceptor/Michael donor reactions.

Thus, a first functional group can comprise an isocyanate and a second functional group can comprise a hydroxyl group, an amine group, or a combination thereof.

A first functional group can comprise an amine group and a second functional group can comprise an epoxy group.

A first functional group can comprise an epoxy group and a second functional group can comprise an epoxy group.

A first functional group can comprise a Michael acceptor group and a second functional group can comprise a Michael donor group.

A first functional group can be a saturated functional group and the second functional group can be an unsaturated group. Each of the first functional group and the second functional can comprise a saturated functional group. Each of the first functional group and the second functional can comprise an unsaturated functional group. A saturated functional group refers to a functional group and not having a double bond. Examples of saturated functional groups include thiol, hydroxyl, primary amine, secondary amine, and epoxy groups. An unsaturated functional group refers to a group having a reactive double bond. Examples of unsaturated functional groups include alkenyl groups, Michael acceptor groups, isocyanate groups, acyclic carbonate groups, acetoacetate groups, carboxylic acid groups, vinyl ether groups, (meth)acrylate groups, and malonate groups.

The first functional group can be a carboxylic acid group and the second functional group can be an epoxy group.

The first functional group can be a Michael acceptor group such as a (meth)acrylate group, a maleic group, or a fumaric group, and the second functional group can be a primary amine group or a secondary amine group.

The first functional group can be an isocyanate group and the second functional group can be a primary amine group, a secondary amine group, a hydroxyl group, or a thiol group.

The first functional group can be a cyclic carbonate group, an acetoacetate group, or an epoxy group; and the second functional group can be a primary amine group, or a secondary amine group.

The first functional group can be a thiol group, and the second functional group can be an alkenyl group, a vinyl ether group, a (meth)acrylate group.

The first functional group can be a Michael acceptor group such as (meth)acrylate group, a cyanoacrylate, a vinylether a vinylpyridine, or an α,β-unsaturated carbonyl group and the second functional group can be a malonate group, an acetylacetonate, a nitroalkane, or other active alkenyl group.

The first functional group can be a thiol group, and the second functional group can be an alkenyl group, an epoxy group, an isocyanate group, an alkynyl group, or a Michael acceptor group.

The first functional group can be a Michael donor group, and the second functional group can be a Michael acceptor group.

Both the first functional group and the second functional group can be thiol groups.

Both the first functional group and the second functional group can be alkenyl groups.

Both the first functional group and the second functional group can be Michael acceptor groups such as (meth) acrylate groups.

For example, the first reactive compound can comprise a polyamine and/or a polyol and the second reactive compound can comprise a polyisocyanate; the first reactive compound can comprise a Michael acceptor and the second reactive compound can comprise a Michael donor; or the first reactive compound can comprise a polythiol and the second reactive compound can comprise a polythiol, a polyisocyanate, a polyalkenyl, a polyalkynyl, a polyepoxide, a Michael acceptor, or a combination of any of the foregoing.

Functional groups can be selected to coreact at temperatures, for example, less than 50° C., less than 40° C., less than 30° C., less than 20° C., or less than 10° C. Functional groups can be selected to coreact at temperatures, for example, greater than 5° C., greater than 10° C., greater than 20° C., greater than 30° C., or greater than 40° C. Functional groups can be selected to coreact, for example, at temperatures from 5° C. to 50° C., from 10° C. to 40° C., from 15° C., to 35° C., or from 20° C. to 30° C.

The cure rate for any of these coreactive chemistries can be modified by including an appropriate catalyst or combination of catalysts in a coreactive composition. The cure rate for any of these coreactive chemistries can be modified by increasing or decreasing the temperature of the coreactive composition. For example, although a coreactive composition can cure at temperatures less than 30° C. such as less than 25° C. or less than 20° C., heating the coreactive composition can accelerate the reaction rate, which can be desirable under certain circumstances such as to accommodate an increased printing speed. Increasing the temperature of the coreactive components and/or the coreactive composition can also serve to adjust the viscosity to facilitate mixing the coreactive components and/or depositing the coreactive composition.

To form a multilayer system, it can be desirable that certain layers cure faster than other layers. For example, it can be desirable that an exterior layer cure fast to facilitate the ability of an applied multilayer system to retain an intended shape, and an interior layer to cure slowly to develop adhesion and/or desirable physical properties over time.

Each of the coreactive compositions used to prepare a layer of a multilayer system can independently comprise, for example, one or more additives such as, for example, catalysts, polymerization initiators, adhesion promoters, reactive diluents, plasticizers, filler, colorants, photochromic agents, rheology modifiers, cure activators and accelerators, corrosion inhibitors, fire retardants, UV stabilizers, rain erosion inhibitors, or a combination of any of the foregoing.

A coreactive composition can comprise one or more additives selected to impart one or more desired properties to a cured layer of a multilayer system. Example of properties of a cured layer and additives for providing the properties to a layer are provided in the following paragraphs.

A coreactive composition can include a catalyst or a combination of catalysts.

A catalyst or combination of catalysts can be selected to catalyze the reaction of co-reactants in the coreactive composition such as the reaction of the first reactive compound and the second reactive compound. The appropriate catalyst will depend on the curing chemistry. For example, a thiol-ene or thiol epoxy can comprise an amine catalyst.

A coreactive composition can comprise, for example, from 0.1 wt % to 1 wt %, from 0.2 wt % to 0.9 wt %, from 0.3 wt % to 0.7 wt %, or from 0.4 wt % to 0.6 wt % of a catalyst or combination of catalysts, where wt % is based on the total weight of the coreactive composition.

A catalyst can include a latent catalyst or combination of latent catalysts. Latent catalysts include catalysts that have little or no activity until released or activated, for example, by physical and/or chemical mechanisms. Latent catalysts may be contained within a structure or may be chemically blocked. A controlled release catalyst may release a catalyst upon exposure to ultraviolet radiation, heat, ultrasonication, or moisture. A latent catalyst can be sequestered within a core-shell structure or trapped within a matrix of a crystalline or semi-crystalline polymer where the catalyst can diffuse from the encapsulant with time or upon activation such as by the application of thermal or mechanical energy.

A coreactive composition can comprise a dark cure catalyst or a combination of dark cure catalysts. A dark cure catalyst refers to a catalyst capable of generating free radicals without being exposed to electromagnetic energy.

Dark cure catalysts include, for example, combinations of metal complexes and organic peroxides, tialkylborane complexes, and peroxide-amine redox initiators. A dark cure catalyst can be used in conjunction with a photopolymerization initiator or independent of a photopolymerization initiator.

A coreactive composition based on thiol/thiol curing chemistries can comprise a cure activator or a combination of cure activators to initiate the thiol/thiol polymerization reaction. Cure activators can be used for example in a coreactive composition in which both the first reactive compound and the second reactive compound comprise thiol-terminated sulfur-containing prepolymers, such as thiol-terminated polysulfide prepolymers.

A cure activator can comprise an oxidizing agent capable of oxidizing mercaptan groups to form disulfide bonds. Examples of suitable oxidizing agents include lead dioxide, manganese dioxide, calcium dioxide, sodium perborate monohydrate, calcium peroxide, zinc peroxide, and dichromate.

A cure activator can comprise an inorganic activator, an organic activator, or a combination thereof.

Examples of suitable inorganic activators include metal oxides. Examples of suitable metal oxide activators include zinc oxide (ZnO), lead oxide (PbO), lead peroxide ($PbO_3$), manganese dioxide ($MnO_2$), sodium perborate ($NaBO_3 \cdot H_2O$), potassium permanganate ($KMnO_4$), calcium peroxide ($CaCO_3$), barium peroxide ($BaO_3$), cumene hydroperoxide, and combinations of any of the foregoing. A cure activator can be $MnO_2$.

A coreactive composition based on thiol/thiol curing chemistries can comprise, for example, from 1 wt % to 10 wt % of a cure activator or combination of cure activators, wherein wt % is based on the total weight of the coreactive composition. For example, a coreactive composition can comprise from 1 wt % to 9 wt %, from 2 wt % to 8 wt %, from 3 wt % to 7 wt %, or from 4 wt % to 6 wt % of an activator or a combination of cure activators, wherein wt % is based on the total weight of the coreactive composition. For example, a coreactive composition can comprise greater than 1 wt % of a cure activator or a combination of cure activators, greater than 2 wt %, greater than 3 wt %, greater than 4 wt %, greater than 5 wt %, or greater than 6 wt % of a cure actuator or combination of cure activators, wherein wt % is based on the total weight of the coreactive composition.

A coreactive composition based on thiol/thiol curing chemistries can include a cure accelerator or combination of cure accelerators.

Cure accelerators can act as sulfur donors to generate active sulfur fragments capable of reacting with the thiol groups of a thiol-terminated polysulfide prepolymer.

Examples of suitable cure accelerators include thiazoles, thiurams, sulfenamides, guanidines, dithiocarbamates, xanthates, thioureas, aldehydeamines, and combinations of any of the foregoing.

A cure accelerator can comprise thiuram polysulfide, a thiuram disulfide, or a combination thereof.

Examples of other suitable cure accelerators also include triazines and sulfides or metallic and amine salts of dialkyldithiophosphoric acids and dithiophosphates such as triazines and sulfides or metallic and amine salts of dialkyldithiophosphoric acids, and combinations of any of the foregoing. Examples of non-sulfur-containing cure accelerators include tetramethyl guanidine (TMG), di-o-tolyl guanidine (DOTG), sodium hydroxide (NaOH), water and bases.

A coreactive composition can comprise, for example, from 0.01 wt % to 2 wt % of a cure accelerator or combination of cure accelerators, from 0.05 wt % to 1.8 wt %, from 0.1 wt % to 1.6 wt %, or from 0.5 wt % to 1.5 wt % of a cure accelerator or combination of cure accelerators, where wt % is based on the total weight of the coreactive composition. A coreactive composition can comprise, for example, less than 2 wt %, less than 1.8 wt %, less than 1.6 wt %, less than 1.4 wt %, less than 1.2 wt %, less than 1 wt %, less than 0.5 wt %, less than 0.1 wt %, or less than 0.05 wt % of a cure accelerator or combination of cure accelerators, where wt % is based on the total weight of the coreactive composition.

A coreactive composition can comprise one or more free radial initiators such as thermally-activated free radical initiators or free radical initiators activated by actinic radiation.

A coreactive composition can be curable by actinic radiation such as a sealant composition based on thiol/alkenyl, thiol/alkynyl and alkenyl/alkenyl curing chemistries. A coreactive composition that are curable by visible or ultraviolet radiation can comprise a photopolymerization initiator or combination of photopolymerization initiators.

A coreactive composition can include a photoinitiator or combination of photoinitiators. The radiation can be actinic radiation that can apply energy effective in generating an initiating species from a photopolymerization initiator upon irradiation therewith, and widely includes α-rays, γ-rays, X-rays, ultraviolet (UV) light including UVA, UVA, and UVC spectra), visible light, blue light, infrared, near-infrared, or an electron beam. For example, the photoinitiator can be a UV photoinitiator.

Examples of suitable UV photoinitiators include a-hydroxyketones, benzophenone, α, α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclophosphine oxide, benzophenone photoinitiators, oxime photoinitiators, phosphine oxide photoinitiators, and combinations of any of the foregoing.

A coreactive composition can comprise from 0.05 wt % to 5 wt %, from 0.1 wt % to 4.0 wt %, from 0.25 wt % to 3.0 wt %, from 0.5 wt % to 1.5 wt % of a photoinitiator or combination of photoinitiators, where wt % is based on the total weight of the coreactive composition.

A coreactive composition can comprise a thermally active free radical initiator. A thermally activated free radical initiator can become active at elevated temperature, such as at a temperature greater than 25° C.

Examples of suitable thermally activated free radical initiators include organic peroxy compounds, azobis(organonitrile) compounds, N-acyloxyamine compounds, O-imino-isourea compounds, and combinations of any of the foregoing. Examples of suitable organic peroxy compounds, that may be used as thermal polymerization initiators include peroxymonocarbonate esters, such as tertiary-butylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, and combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2,4-dimethylvaleronitrile). A thermally activated free radical initiator can comprise 1-acetoxy-2,2,6,6-tetramethylpiperidine and/or 1,3-dicyclohexyl-O—(N-cyclohexylideneamino)-isourea.

A coreactive composition can comprise an adhesion promoter or combination of adhesion promoters. Adhesion promoters can enhance the adhesion of a sealant to an underlying substrate such as a metal, composite, polymeric, or a ceramic surface, or to a coating such as a primer coating or other coating layer. Adhesion promoters can enhance adhesion to filler and to other layers of a multilayer system.

An adhesion promoter can include a phenolic adhesion promoter, a combination of phenolic adhesion promoters, an organo-functional silane, a combination of organo-functional silanes, or a combination of any of the foregoing. An organo-functional alkoxysilane can be an amine-functional alkoxysilane. The organo group can be selected from, for example, a thiol group, an amine group, an epoxy group, an alkenyl group, an isocyanate group, or a Michael acceptor group.

A phenolic adhesion promoter can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. A cooked phenolic resin refers to a phenolic resin that has been coreacted with a monomer or prepolymer.

A phenolic adhesion promoter can comprise the reaction product of a condensation reaction of a phenolic resin with one or more thiol-terminated polysulfides. Phenolic adhesion promoters can be thiol-terminated.

Examples of suitable phenolic resins include those synthesized from 2-(hydroxymethyl)phenol, (4-hydroxy-1,3-phenylene)dimethanol, (2-hydroxybenzene-1,3,4-thyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

A coreactive composition can comprise an organo-functional alkoxysilane adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^{20}$—$(CH_2)_n$—$Si(-OR)_{3-n}R_n$, where $R^{20}$ is an organofunctional group, n is 0, 1, or 2, and R is alkyl such as methyl or ethyl. Examples of organofunctional groups include epoxy, amino, methacryloxy, or sulfide groups. An organo-functional alkoxysilane can be a dipodal alkoxysilane having two or more alkoxysilane groups, a functional dipodal alkoxysilane, a non-functional dipodal alkoxysilane or a combination of any of the foregoing. An organofunctional alkoxysilane can be a combination of a monoalkoxysilane and a dipodal alkoxysilane. For amino functional alkoxysilanes, $R^{20}$ can be —$NH_2$.

Examples of suitable amino-functional alkoxysilanes under the Silquest® tradename include γ-aminopropyltriethoxysilane (Silquest® A-1100), γ-aminopropylsilsesquioxane (Silquest® A-1108), γ-aminopropyltrimethoxysilane (Silquest® A-1110), N-β-(aminoethyl)-γ-aminopropyltrimethoxysilane (Silquest® 1120), benzylamino-silane (Silquest® 1128), triaminofunctional silane (Silquest® A-1130), bis-(γ-triethoxysilylpropyl)amine (Silquest® Y-11699), bis-(γ-trimethoxysilylpropyl)amine (Silquest® A-1170), polyazamide (Silquest® A-1387), ethoxy based polyazamide (Silquest® Y-19139), and N—β-(aminoethyl)-γ-aminopropylmethyldimethoxysilane (Silquest® A-2120).

Suitable amine-functional alkoxysilanes are commercially available, for example, from Gelest Inc, from Dow Corning Corporation, and Momentive.

A coreactive composition can comprise, for example, from 1 wt % to 16 wt % of an adhesion promoter, from 3 wt % to 14 wt %, from 5 wt % to 12 wt %, or from 7 wt % to 10 wt % of an adhesion promoter or combination of adhesion promoters, where wt % is based on the total weight of the coreactive composition.

A coreactive composition can comprise less than 16 wt % of an adhesion promoter, less than 14 wt %, less than 12 wt %, less than 10 wt %, less than 8 wt %, less than 6 wt %, less than 4 wt % or less than 2 wt % of an adhesion promoter or combination of adhesion promoters, where wt % is based on the total weight of the coreactive composition.

A coreactive composition for forming a layer of a multilayer system can comprise a filler or combination of filler. A filler can comprise, for example, inorganic filler, organic filler, low-density filler such as a filler having a specific gravity less than 1, conductive filler, or a combination of any of the foregoing.

A coreactive composition for forming a multilayer system can comprise an inorganic filler or combination of inorganic filler.

An inorganic filler can be included, for example, to provide mechanical reinforcement and to control the rheological properties of the composition. Inorganic filler may be added to compositions to impart desirable physical properties such as, for example, to increase the impact strength, to control the viscosity, or to modify the electrical properties of a cured coreactive composition.

Inorganic filler useful in a sealant composition include carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

Suitable calcium carbonate filler can include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition. An inorganic filler can include surface-modified particles such as, for example, surface modified silica. The surface of silica particles can be modified, for example, to be tailor the hydrophobicity or hydrophilicity of the surface of the silica particle. The surface modification can affect the dispensability of the particles, the viscosity, the curing rate, and/or the adhesion.

A coreactive composition can comprise an organic filler or a combination of organic filler.

Organic filler can be selected to have a low specific gravity and to be resistant to solvents such as JRF Type I and/or to reduce the density of a layer. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, within a range from 0.85 to 1.15, within a range from 0.9 to 1.1, within a range from 0.9 to 1.05, or from 0.85 to 1.05.

Organic filler can comprise thermoplastics, thermosets, or a combination thereof. Examples of suitable thermoplastics and thermosets include epoxies, epoxy-amides, ethylene tetrafluoroethylene copolymers, nylons, polyethylenes, polypropylenes, polyethylene oxides, polypropylene oxides, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

An organic filler can have any suitable shape. For example, an organic filler can comprise fractions of crushed polymer that has been filtered to select a desired size range. An organic filler can comprise substantially spherical particles. Particles can be solid or can be porous.

An organic filler can have an average particle size, for example, within a range from 1 μm to 100 μm, 2 μm to 40 μm, from 2 μm to 30 μm, from 4 μm to 25 μm, from 4 μm to 20 μm, from 2 μm to 12 μm, or from 5 μm to 15 μm. An organic filler can have an average particle size, for example, less than 100 μm, less than 75 μm, less than 50 μm, less than 40 μm, or less than 20 μm. Particle size distribution can be determined using a Fischer Sub-Sieve Sizer or by optical inspection.

An organic filler can include a low-density filler such as a modified, expanded thermoplastic microcapsules. Suitable modified expanded thermoplastic microcapsules can include an exterior coating of a melamine or urea/formaldehyde resin.

A coreactive composition can comprise low density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 μm to 70 μm, in some cases 10 μm to 24 μm, or from 10 μm to 17 μm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787-11. Low density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787-11.

Low density filler such as low microcapsules can be characterized by a average particle diameter from 1 μm to 100 μm and can have a substantially spherical shape. A substantially spherical particle can have a maximum cross-sectional dimension that is less than the minimum cross-sectional dimension of a particle Low density filler such as low-density microcapsules can be characterized, for example, by a average particle diameter from 10 μm to 100 μm, from 10 μm to 60 μm, from 10 μm to 40 μm, or from 10 μm to 30 μm, as determined according to ASTM D6913.

Low density filler such as low-density microcapsules can comprise expanded microcapsules or microballoons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

With the coating of an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ISO 787-11.

A coreactive composition can comprise micronized oxidized polyethylene homopolymer. An organic filler can include a polyethylenes, such as an oxidized polyethylene powder. Suitable polyethylenes are available, for example, from Honeywell International, Inc. under the tradename ACumist®, from INEOS under the tradename Eltrex®, and Mitsui Chemicals America, Inc. under the tradename Mipelon®.

A coreactive composition can comprise, for example, from 1 wt % to 90 wt % of low-density filler, from 1 wt % to 60 wt %, from 1 wt % to 40 wt %, from 1 wt % to 20 wt %, from 1 wt % to 10 wt %, or from 1 wt % to 5 wt % of low-density filler, where wt % is based on the total weight of the coreactive composition.

A coreactive composition can comprise greater than 1 wt % low density filler, greater than 1 wt %, greater than 2 wt %, greater than 3 wt %, greater than 4 wt %, greater than 6 wt %, or greater than 10 wt % low-density filler, where wt % is based on the total weight of the coreactive composition.

A coreactive composition can comprise from 1 vol % to 90 vol % low-density filler, from 5 vol % to 70 vol %, from 10 vol % to 60 vol %, from 20 vol % to 50 vol %, or from 30 vol % to 40 vol % low density filler, where vol % is based on the total volume of the coreactive composition.

A coreactive composition can comprise greater than 1 vol % low-density filler, greater than 5 vol %, greater than 10 vol %, greater than 20 vol %, greater than 30 vol %, greater than 40 vol %, greater than 50 vol %, greater than 60 vol %, greater than 70 vol %, or greater than 80 vol % low-density filler, where vol % is based on the total volume of the coreactive composition.

A coreactive composition can include a conductive filler or a combination of conductive filler. A conductive filler can include electrically conductive filler, semiconductive filler, thermally conductive filler, magnetic filler, EMI/RFI shielding filler, static dissipative filler, electroactive filler, or a combination of any of the foregoing. EMI/RFI shielding effectiveness can be determined according to ASTM D4935

A coreactive composition can comprise an electrically conductive filler or combination of electrically conductive filler.

To render a cured layer electrically conductive, the concentration of an electrically conductive filler can be above the electrical percolation threshold, where a conductive network of electrically conductive particles is formed. Once the electrical percolation threshold is achieved, the increase in conductivity as function of filler loading can be modeled by a simple power-law expression:

$$\sigma_c = \sigma_f (\varphi - \varphi_c)_t \qquad \text{EQN. 1}$$

where $\varphi$ is the filler volume fraction, $\varphi_c$ is the percolation threshold, $\sigma_f$ is the filler conductivity, $\varphi$ is the composite conductivity, and t is a scaling component. The filler need not be in direct contact for current flow and conduction can take place via tunneling between thin layers of binder surrounding the electrically conductive filler particles, and this tunneling resistance can be the limiting factor in the conductivity of an electrically conductive layer.

A conductive filler can have any suitable shape and/or dimensions. For example, an electrically conductive filler can be in form of particles, powders, flakes, platelets, filaments, fiber, crystals, or a combination of any of the foregoing.

A conductive filler can comprise a combination of conductive filler having different shapes, different dimensions, different properties such as, for example, different thermal conduction, electrical conduction, magnetic permittivity, electromagnetic properties, or a combination of any of the foregoing.

A conductive filler can be a solid or can be in the form of a substrate such as a particle having a coating of a conductive material. For example, a conductive filler can be a low-density microcapsule having an exterior conductive coating.

Examples of suitable conductive filler such as electrically conductive filler include metals, metal alloys, conductive oxides, semiconductors, carbon, carbon fiber, and combinations of any of the foregoing.

Other examples of electrically conductive filler include electrically conductive noble metal-based filler such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive filler. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive filler and shapes of electrically conductive filler can be used to achieve a desired conductivity, EMI/RFI shielding effectiveness, hardness, and other properties suitable for a particular application.

The amount and type of electrically conductive filler can be selected to produce a coreactive composition which, when cured, exhibits a sheet resistance (four-point resistance) of less than 0.50 Ω/cm², or a sheet resistance less than 0.15 Ω/cm². The amount and type of filler can also be selected to provide effective EMI/RFI shielding over a frequency range of from 1 MHz to 18 GHz for an aperture sealed using a multilayer composition provided by the present disclosure.

Organic filler, inorganic filler, and low-density filler can be coated with a metal to provide conductive filler.

An electrically conductive filler can include graphene. Graphene comprises a densely packed honeycomb crystal lattice made of carbon atoms having a thickness equal to the atomic size of one carbon atom, i.e., a monolayer of $sp^2$ hybridized carbon atoms arranged in a two-dimensional lattice.

Graphene can comprise graphenic carbon particles. Graphenic carbon particles refer to carbon particles having structures comprising one or more layers of one-atom-thick planar sheets of $sp^2$-bonded carbon atoms that are densely packed in a honeycomb crystal lattice. An average number of stacked layers can be less than 100, for example, less than 50. An average number of stacked layers can be 30 or less, such as 20 or less, 10 or less, or, in some cases, 5 or less. Graphenic carbon particles can be substantially flat, however, at least a portion of the planar sheets may be substantially curved, curled, creased or buckled. Graphenic carbon particles typically do not have a spheroidal or equiaxed morphology.

Graphenic carbon particles can have a thickness, measured in a direction perpendicular to the carbon atom layers, for example, of no more than 10 nm, no more than 5 nm, or no more than 4 or 3 or 2 or 1 nm, such as no more than 3.6 nm. Graphenic carbon particles can be from 1 atom layer up to 3, 6, 9, 12, 20 or 30 atom layers thick, or more. Graphenic carbon particles can have a width and length, measured in a direction parallel to the carbon atoms layers, of at least 50 nm, such as more than 100 nm, more than 100 nm up to 500 nm, or more than 100 nm up to 200 nm. Graphenic carbon particles can be provided in the form of ultrathin flakes, platelets or sheets having relatively high aspect ratios, where the aspect ratio is the ratio of the longest dimension of a particle to the shortest dimension of the particle, of greater than 3:1, such as greater than 10:1.

Graphenic carbon particles can comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges.

Graphenic carbon particles can be functionalized. Functionalized graphenic carbon particles refers to graphenic carbon particles where organic groups are covalently bonded to the graphenic carbon particles. The graphenic carbon particles can be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. Graphenic carbon particles may also be functionalized by other reactions such as Diels-Alder addition reactions, 1,3-dipolar cycloaddition reactions, free radical addition reactions and diazonium addition reactions. Hydrocarbon and phenyl groups may be further functionalized. For graphenic carbon particles having a hydroxyl functionality, the hydroxyl functionality can be modified and extended by reacting these groups with, for example, an organic isocyanate.

Different types of graphenic carbon particles may be used in a coreactive composition.

A coreactive composition can comprise, for example, from 2 wt % to 50 wt %, from 4 wt % to 40 wt %, from 6 wt % to 35 wt %, or from 10 wt % to 30 wt % thermally produced graphenic carbon particles.

Filler used to impart electrical conductivity and EMI/RFI shielding effectiveness can be used in combination with graphene.

Electrically conductive non-metal filler, such as carbon nanotubes, carbon fibers such as graphitized carbon fibers, and electrically conductive carbon black, can also be used in a coreactive composition in combination with graphene.

Conductive filler can comprise magnetic filler or combination of magnetic filler.

The magnetic filler can include a soft magnetic metal. This can enhance permeability of the magnetic mold resin. As a main component of the soft magnetic metal, at least one magnetic material selected from Fe, Fe—Co, Fe—Ni, Fe—Al, and Fe—Si may be used. A magnetic filler can be a soft magnetic metal having a high bulk permeability. As the soft magnetic metal, at least one magnetic material selected can be Fe, FeCo, FeNi, FeAl, and FeSi may be used. Specific examples include a Permalloy (FeNi alloy), a super Permalloy (FeNiMo alloy), a sendust (FeSiAl alloy), an FeSi alloy, an FeCo alloy, an FeCr alloy, an FeCrSi alloy, FeNiCo alloy, and Fe. Other examples of magnetic filler include iron-based powder, iron-nickel based powder, iron powder, ferrite powder, Alnico powder, $Sm_2Co_{17}$ powder, Nd—B—Fe powder, barium ferrite $BaFe_2O_4$, bismuth ferrite $BiFeO_3$, chromium dioxide $CrO_2$, SmFeN, NdFeB, and SmCo.

A surface of the magnetic filler can be insulation-coated or can have a film thickness of the insulation coating equal to or larger than 10 nm.

A surface of the magnetic filler can be insulation-coated with a metal oxide such as Si, Al, Ti, Mg or an organic material for enhancing fluidity, adhesion, and insulation performance.

Examples of suitable carbonaceous materials for use as conductive filler other than graphene and graphite include, for example, graphitized carbon black, carbon fibers and fibrils, vapor-grown carbon nanofibers, metal coated carbon fibers, carbon nanotubes including single- and multi-walled nanotubes, fullerenes, activated carbon, carbon fibers, expanded graphite, expandable graphite, graphite oxide, hollow carbon spheres, and carbon foams.

Conductive filler can include semiconductors or combinations of semiconductors.

Examples of suitable semiconductive materials include semiconducting nanomaterials such as nanoparticles, nanorods, nanowires, nanotubes, and nanosheets, semiconducting metal oxides such as tin oxide, antimony oxide, and indium oxide, semiconducting polymers such as PEDOT:PSS, polythiophenes, poly(p-phenylene sulfide), polyanilines, poly(pyrrole)s, poly(acetylene)s, poly(p-phenylene vinylene), polyparaphenylene, any other conjugated polymer, and semiconducting small molecules, for example, having a molecular mass less than 5,000 Da, such as rubrene, pentacene, anthracene, and aromatic hydrocarbons. Examples of semiconducting nanomaterials include quantum dots, III-V or II-VI semiconductors, Si, Ge, transition metal dichalcogenides such as $WS_2$, $WSe_2$, and $MoSe_s$, graphene nanoribbons, semiconducting carbon nanotubes, and fullerenes and fullerene derivatives.

A filler can include metal fiber such as steel, titanium, aluminum, gold, silver, and alloys of any of the foregoing.

Examples of suitable ceramic fiber include metal oxide such as alumina fibers, aluminasilicate fibers, boron nitride fibers, silicon carbide fibers, and combinations of any of the foregoing.

Examples of suitable inorganic fiber include carbon, alumina, basalt, calcium silicate, and rock wool.

A fiber can be a glass fiber such as S-glass fibers, E-glass fibers, soda-lime-silica fibers, basalt fibers, or quartz fibers. Glass fibers may be in the form of woven and/or braided glass fibers, or non-woven glass fibers.

A fiber can include carbon such as graphite fibers, glass fibers, ceramic fibers, silicon carbide fibers, polyimide fibers, polyamide fibers, or polyethylene fibers. Continuous fibers can comprise titanium, tungsten, boron, shape memory alloy, graphite, silicon carbide, boron, aramid, poly(p-phenylene-2,6-benzobisoxazole), and combinations of any of the foregoing.

Fiber capable of withstanding high temperature include, for example, carbon fiber, high-strength glass ($SiO_2$) fiber, oxide fiber, alumina fiber, ceramic fiber, metal fiber, and fibers of high temperature thermoplastics or thermosets.

A filler can include carbon nanotubes. Suitable carbon nanotubes can be characterized by a thickness or length, for example, from 1 nm to 5,000 nm. Suitable carbon nanotubes can be cylindrical in shape and structurally related to fullerenes. Suitable carbon nanotubes can be open or capped at their ends. Suitable carbon nanotubes can comprise, for example, more than 90 wt %, more than 95 wt %, more than 99 wt %, or more than 99.9 wt % carbon, where wt % is based on the total weight of the carbon nanotube.

Carbon nanotubes can be provided as single-walled nanotubes (SWNT) and multi-walled nanotubes (MWNT), for example, as nanotubes having one single wall and nanotubes having more than one wall, respectively. In single-walled nanotubes a one atom thick sheet of atoms, for example, a one atom thick sheet of graphite, i.e., graphene, is rolled seamlessly to form a cylinder. Multi-walled nanotubes consist of a number of such cylinders arranged concentrically.

A multi-walled carbon nanotube can have, for example, on average from 5 to 15 walls.

Single-walled nanotubes can be characterized by a diameter of at least 0.5 nm, such as at least 1 nm, or at least 2 nm. A SWNT can have a diameter less than 50 nm, such as less than 30 nm, or less than 10 nm. A length of single-walled nanotubes can be at least 0.05 µm, at least 0.1 µm, or at least 1 µm. A length can be less than 50 mm, such as less than 25 mm.

Multi-walled nanotubes can be characterized by an outer diameter of at least 1 nm, such as at least 2 nm, 4 nm, 6 nm, 8 nm, or at least 9 nm. An outer diameter can be less than 100 nm, less than 80 nm, 60 nm, 40 nm, or less than 20 nm. The outer diameter can be from 9 nm to 20 nm. A length of a multi-walled nanotube can be less than 50 nm, less than 75 nm, or less than 100 nm. A length can be less than 500 µm, or less than 100 µm. A length can be from 100 nm to 10 µm. A multi-walled carbon nanotube can have an average outer diameter from 9 nm to 20 nm and/or an average length from 100 nm to 10 µm.

Carbon nanotubes can have a BET surface area, for example, from 200 $m^2$/g to 400 $m^2$/g. Carbon nanotubes can have a mean number of from 5 walls to 15 walls. BET surface area can be determined according to ASTM D6556

A coreactive composition can comprise a thermally-conductive filler or combination of thermally-conductive filler.

A thermally conductive filler can include, for example, metal nitrides such as boron nitride, silicon nitride, aluminum nitride, boron arsenide, carbon compounds such as diamond, graphite, carbon black, carbon fibers, graphene, and graphenic carbon particles, metal oxides such as aluminum oxide, magnesium oxide, beryllium oxide, silicon dioxide, titanium oxide, nickel oxide, zinc oxide, copper oxide, tin oxide, metal hydroxides such as aluminum hydroxide or magnesium hydroxide, carbides such as silicon carbide, minerals such as agate and emery, ceramics such as ceramic microspheres, mullite, silica, silicon carbide, carbonyl iron, cerium (III) molybdate, copper, zinc, or combinations of any of the foregoing.

A coreactive composition can comprise greater than 5 wt % of a conductive filler, greater than 10 wt %, greater than 20 wt %, greater than 30 wt %, greater than 40 wt %, greater than 50 wt %, greater than 60 wt %, greater than 70 wt %, greater than 80 wt %, greater than 90 wt %, or greater than 95 wt % of a conductive filler, where wt % is based on the total weight of the coreactive composition. A coreactive composition can comprise less than 5 wt % of a conductive filler, less than 10 wt %, less than 20 wt %, less than 30 wt %, less than 40 wt %, less than 50 wt %, less than 60 wt %, less than 70 wt %, less than 80 wt %, less than 90 wt %, or less than 95 wt % of a conductive filler, where wt % is based on the total weight of the coreactive composition. A coreactive composition provided by the present disclosure can have from 1 wt % to 95 wt % of a conductive filler, from 5 wt % to 75 wt %, from 10 wt % to 60 wt %, or from 20 wt % to 50 wt % of a conductive filler, where wt % is based on the total weight of the coreactive composition.

A coreactive composition can comprise greater than 5 vol % of a conductive filler, greater than 10 vol %, greater than 20 vol %, greater than 30 vol %, greater than 40 vol %, greater than 50 vol %, greater than 60 vol %, greater than 70 vol %, greater than 80 vol %, greater than 90 vol %, or greater than 95 vol % of a conductive filler, where vol % is based on the total volume of the coreactive composition. A coreactive composition can comprise less than 5 vol % of a conductive filler, less than 10 vol %, less than 20 vol %, less than 30 vol %, less than 40 vol %, less than 50 vol %, less than 60 vol %, less than 70 vol %, less than 80 vol %, less than 90 vol %, or less than 95 vol % of a conductive filler, where vol % is based on the total volume of the coreactive composition. A coreactive composition provided by the present disclosure can have from 1 vol % to 95 vol % of a conductive filler, from 5 vol % to 75 vol %, from 10 vol % to 60 vol %, or from 20 vol % to 50 vol % of a conductive filler, where vol % is based on the total volume of the coreactive composition.

A coreactive composition can comprise a reactive diluent or combination of reactive diluents. A reactive diluent can be used to reduce the initial viscosity of the coreactive composition. A reactive diluent can be a compound having at least one functional group capable of reacting with at least one of the major reactants of the composition and become part of the cross-linked network. A reactive diluent can have, for example, one functional group, or two functional group. A reactive dilute can be used to control the viscosity of a composition or improve the wetting of filler in a coreactive composition.

A coreactive composition can comprise a hydroxyl-functional vinyl ether or combination of hydroxyl-functional vinyl ethers as reactive diluents.

A hydroxyl-functional vinyl ether can have the structure of Formula (12):

$$CH_2=CH-O-(CH_2)_w-OH \quad (12)$$

where w is an integer from 2 to 10. In hydroxyl-functional vinyl ethers of Formula (12), w can be 2, 3, 4, 5, or w can be 6. Examples of suitable hydroxyl-functional vinyl ethers include 1-methyl-3-hydroxypropyl vinyl ether, 4-hydroxybutyl vinyl ether, and a combination thereof. A hydroxyl-functional vinyl ether can be 4-hydroxybutyl vinyl ethers as reactive diluents.

A coreactive composition can comprise, for example, from 0.1 wt % to 10 wt % of a hydroxyl-functional vinyl ether, from 0.2 wt % to 9 wt %, from 0.3 wt % to 0.7 wt % and from 0.4 wt % to 0.7 wt %, where wt % is based on the total weight of the coreactive composition.

A coreactive composition can comprise an amino-functional vinyl ether or combination of amino-functional vinyl ethers.

An amino-functional vinyl ether can have the structure of Formula (13):

$$CH_2=CH-O-(CH_2)_t-NH_2 \quad (13)$$

where t is an integer from 2 to 10. In amino-functional vinyl ethers of Formula (13), t can be 2, 3, 4, 5, or t can be 6. Examples of suitable amino-functional vinyl ethers include 1-methyl-3-aminopropyl vinyl ether, 4-aminobutyl vinyl ether, and a combination of any of the foregoing. An amino-functional vinyl ether can be 4-aminobutyl vinyl ether.

A coreactive composition can comprise an epoxy-functional vinyl ether or combination of epoxy-functional vinyl ethers.

A hydroxyl-functional vinyl ether can have the structure of Formula (14):

$$CH_2=CH-O-(CH_2)_w-R \quad (14)$$

where w is an integer from 2 to 10, and R is an epoxy group. In epoxy-functional vinyl ethers of Formula (14), w can be 2, 3, 4, 5, or w can be 6. An epoxy-functional vinyl ether can be 2-(4(vinyloxy)butyl)oxirane.

A coreactive composition can comprise, for example, from 0.1 wt % to 10 wt % of an amino-functional vinyl ether, from 0.2 wt % to 9 wt %, from 0.3 wt % to 0.7 wt % and from 0.4 wt % to 0.7 wt %, where wt % is based on the total weight of the coreactive composition.

A coreactive composition can comprise vinyl-based diluents such as styrene, α-methyl styrene and para-vinyl toluene; vinyl acetate; and/or n-vinyl pyrrolidone as a reactive diluent.

A coreactive composition can contain a plasticizer or a combination of plasticizers. Plasticizers can be included to adjust the initial viscosity of the coreactive composition and to facilitate application.

Examples of suitable plasticizers include a combination of phthalates, terephathlic, isophathalic, hydrogenated terphenyls, quaterphenyls and higher or polyphenyls, phthalate esters, chlorinated paraffins, modified polyphenyl, tung oil, benzoates, dibenzoates, thermoplastic polyurethane plasticizers, phthalate esters, naphthalene sulfonate, trimellitates, adipates, sebacates, maleates, sulfonamides, organophosphates, polybutene, butyl acetate, butyl cellosolve, butyl carbitol acetate, dipentene, tributyl phosphate, hexadecanol, diallyl phthalate, sucrose acetate isobutyrate, epoxy ester of iso-octyl tallate, benzophenone and combinations of any of the foregoing.

A coreactive composition can comprise from 0.5 wt % to 7 wt % of a plasticizer or combination of plasticizers from 1 wt % to 6 wt %, from 2 wt % to 5 wt % or from 2 wt % to 4 wt % of a plasticizer or combination of plasticizers, where wt % is based on the total weight of the coreactive composition. A coreactive composition can comprise less than 8 wt % plasticizer, less than 6 wt %, less than 4 wt %, or less than 2 wt % of a plasticizer or combination of plasticizers, where wt % is based on the total weight of the coreactive composition.

A coreactive composition can comprise a corrosion inhibitor or combination of corrosion inhibitors.

Examples of suitable corrosion inhibitors include zinc phosphate-based corrosion inhibitors, a lithium silicate corrosion inhibitor such as lithium orthosilicate ($Li_4SiO_4$) and lithium metasilicate ($Li_2SiO_3$), MgO, an azole, a monomeric amino acid, a dimeric amino acid, an oligomeric amino acid, a nitrogen-containing heterocyclic compound such as an azole, oxazole, thiazole, thiazolines, imidazole, diazole, pyridine, indolizine, and triazine, tetrazole, and/or tolyltriazole, corrosion resistant particles such as inorganic oxide particles, including for example, zinc oxide (ZnO), magnesium oxide (MgO), cerium oxide ($CeO_2$), molybdenum oxide ($MoO_3$), and/or silicon dioxide ($SiO_2$), and combinations of any of the foregoing.

A coreactive composition can comprise less than 5 wt % of a corrosion inhibitor or combination of corrosion inhibitors, less than 3 wt %, less than 2 wt %, less than 1 wt %, or less than 0.5 wt % of a corrosion inhibitor or combination of a corrosion inhibitors, where wt % is based on the total weight of the coreactive composition. A coreactive composition can comprise, for example, greater than 0.1 wt % of a corrosion inhibitor, greater than 0.5 wt %, greater than 1 wt %, or greater than 2 wt % of a corrosion inhibitor, where wt % is based on the total weight of the coreactive composition.

A coreactive composition can comprise a fire retardant or combination of fire retardants.

A fire retardant can include an inorganic fire retardant, an organic fire retardant, or a combination thereof.

Examples of suitable inorganic fire retardants include aluminum hydroxide, magnesium hydroxide, zinc borate, antimony oxides, hydromagnesite, aluminum trihydroxide (ATH), calcium phosphate, titanium oxide, zinc oxide, magnesium carbonate, barium sulfate, barium borate, kaolinite, silica, antimony oxides, and combinations of any of the foregoing.

Examples of suitable organic fire retardants include halocarbons, halogenated esters, halogenated ethers, chlorinated and/or brominated flame retardants, halogen free compounds such as organophosphorus compounds, organonitrogen compounds, and combinations of any of the foregoing.

A coreactive composition can comprise, for example, from 1 wt % to 30 wt %, such as from 1 wt % to 20 wt %, or from 1 wt % to 10 wt % of a flame retardant or combination of flame retardants based on the total weight of the coreactive composition. For example, a coreactive composition can comprise less than 30 wt %, less than 20 wt %, less than 10 wt %, less than 5 wt %, or less than 2 wt %, of a flame retardant or combination of flame retardants based on the total weight of the coreactive composition.

A coreactive composition can comprise a moisture control additive or combination of moisture control additives.

Examples of suitable moisture control additives include synthetic zeolite, activated alumina, silica gel, calcium oxide, magnesium oxide, molecular sieve, anhydrous sodium sulphate, anhydrous magnesium sulphate, alkoxysilanes, and combinations of any of the foregoing.

A coreactive composition can comprise less than 5 wt % of a moisture control additive or combination of moisture control additives, less than 3 wt %, less than 2 wt %, less than 1 wt %, or less than 0.5 wt % of a moisture control additive or combination of a moisture control additives, where wt % is based on the total weight of the coreactive composition.

A coreactive composition can comprise a UV stabilizer or a combination of UV stabilizers. UV stabilizers include UV absorbers and hindered amine light stabilizers. Examples of suitable UV stabilizers include products under the tradenames Cyasorb® (Solvay), Uvinul® (BASF), and Tinuvin® (BASF).

A coreactive composition can comprise colorants such as pigments and/or dyes.

Examples of suitable inorganic pigments include metal-containing inorganic pigments such as those containing cadmium, carbon, chromium, cobalt, copper, iron oxide, lead, mercury, titanium, tungsten, and zinc. Examples further include ultramarine blue, ultramarine violet, reduced tungsten oxide, cobalt aluminate, cobalt phosphate, manganese ammonium pyrophosphate and/or metal-free inorganic pigments. An inorganic pigment nanoparticle can comprise ultramarine blue, ultramarine violet, Prussian blue, cobalt blue and/or reduced tungsten oxide. Examples of specific organic pigments include indanthrone, quinacridone, phthalocyanine blue, copper phthalocyanine blue, and perylene anthraquinone.

Additional examples of suitable pigments include iron oxide pigments, in all shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e.g., carbon black); blue and green pigments derived from copper phthalocyanine, also chlorinated and brominated, in the various a, 13 and c crystalline forms; yellow pigments derived from lead sulfochromate; yellow pigments derived from lead bismuth vanadate; orange pigments derived from lead sulfochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of beta-oxynaphthoic acid; red organic quinacridone pigments; and red organic anthraquinone pigments.

Examples of suitable dyes include acridines, anthraquinones, arylmethane dyes, azo dyes, phthalocyanine dyes, quinone-imine dyes including azin dyes, indamins, indophenyls, oxazins, oxazones, and thiazines, thiazole dyes, saffranin dyes, xanthene dyes including fluorene dyes. Examples of suitable dyes include Alcian blue, Alcian yellow, Alizarin, Alizarin red, Alizarin yellow, Azophloxin, Bismarck brown R, Bismarck brown Y, Brilliant cresyl blue, Chrysoidine R, Crisoidine Y, Congo red, Crystal violet, Ethyl green, Fuchsin acid, Gentian violet, Janus green, Lissamine fast yellow, Malachite green, Martius yellow, Meldola blude, Metanil yellow, Methyl orange, Methyl red, Naphthalene black, Naphthol green, Naphthol yellow, Orange G, Purpurin, Rose bengal, Sudan II, Titan yellow, Tropaeolin O, Tropaeolin OO, Tropaeolin OOO, Victoria blue, and Xylene cyanol.

A coreactive composition can comprise a photochromic material or a combination of photochromic materials.

A photochromic material can be a reversible photochromic material or a non-reversable photochromic material. A photochromic material can be a thermally reversible photochromic material or a thermally non-reversable photochromic material.

A photochromic material can be a compound that is activated by absorbing actinic radiation having a particular wavelength, such as UV radiation, which causes a change in a feature of the photochromic material. A feature change is an identifiable change in a feature of the photochromic material which can be detected using an instrument or visually. Examples of feature changes include a change of color or color intensity and a change in structure or other interactions with energy in the visible UV, infrared (IR), near IR or far IR portions of the electromagnetic spectrum such as absorption and/or reflectance. A color change at visible wavelengths refers to a color change at wavelengths within a range from 400 nm to 800 nm.

A photochromic material can be activated by absorbing radiation energy (visible and non-visible light) having a particular wavelength, such as UV light, to undergo a feature change such as a color change. The feature change can be a change of feature of the photochromic material alone or it can be a change of feature of a coreactive composition. Examples of suitable photochromic materials include spiropyrans, spiropyrimidines, spirooxazines, diarylethenes, photochromic quinones, azobenzenes, other photochromic dyes and combinations thereof. These photochromic materials can undergo a reversible or irreversible feature change when exposed to radiation where the first and second states can be different colors or different intensities of the same color.

A coreactive composition can comprise a photochromic agent sensitive to the degree of cure or the extent of exposure to actinic radiation. A cure indicator can change color upon exposure to actinic radiation, which can be permanent or reversible. A cure indicator can be initially transparent and become colored upon exposure to actinic radiation or can be initially colored and become transparent upon exposure to actinic radiation.

A layer of a multilayer system provided by the present disclosure that exhibits low temperature flexibility can comprise, for example, prepolymers such as silicones, polytetrafluoroethylenes, polythioethers, polysulfides, polyformals, polybutadienes, certain elastomers, and combinations of any of the foregoing.

A layer of a multilayer system provided by the present disclosure that exhibits hydrolytic stability can comprise, for example, prepolymers such as silicones, polytetrafluoroethylenes, polythioethers, polysulfides, polyformals, polybutadienes, certain elastomers, and combinations of any of the foregoing, or compositions having a high crosslinking density and/or can comprise an elastomer.

A layer of a multilayer system provided by the present disclosure that exhibits high temperature resistance can comprise, for example, prepolymers such as silicones, polytetrafluoroethylenes, polythioethers, polysulfides, polyformals, polybutadienes, certain elastomer, and combinations of any of the foregoing; or compositions having a high crosslinking density.

A layer of a multilayer system provided by the present disclosure that exhibits a high tensile strength can comprise, for example, elastomeric prepolymers such a silicones and polybutadiene, compositions having high crosslinking density, inorganic filler, and combinations of any of the foregoing.

A layer of a multilayer system provided by the present disclosure that exhibits a high % elongation can comprise, for example, elastomeric prepolymers such a silicones and polybutadiene, compositions having high crosslinking density, inorganic filler, and combinations of any of the foregoing.

A layer of a multilayer system provided by the present disclosure that exhibits substrate bonding or bonding to a primer coating can comprise, for example, adhesion promoters such as organo-functional alkoxysilanes, phenolic resins, cooked phenolic resins, and combinations of any of the foregoing, titanates, partially hydrolyzed alkoxysilanes, or combinations thereof.

A layer of a multilayer system provided by the present disclosure that exhibits interlayer adhesion can comprise, for example, adhesion promoters, unreacted functional groups that are reactive with compounds in the adjoining layer, and combinations thereof.

A layer of a multilayer system provided by the present disclosure that exhibits a fast tack free time can comprise, for example, coreactants having a fast cure chemistry, systems curable by actinic radiation, catalysts, and combinations of any of the foregoing.

A layer of a multilayer system provided by the present disclosure can exhibit, for example, a tack free time less than 5 minutes where tack free time from when the coreactants are first mixed to the time a cotton ball no longer adheres to the surface of the curing sealant.

A layer of a multilayer system provided by the present disclosure that exhibits a fast time to a hardness of Shore 10A can comprise, for example, coreactants having a fast cure chemistry, systems curable by actinic radiation, catalysts, and combinations of any of the foregoing.

A layer of a multilayer system provided by the present disclosure that exhibits electrical conductivity, EMI/RFI shielding, and/or static dissipation can comprise, for example, electrically conductive filler or a combination of electrically conductive filler.

A layer of a multilayer system provided by the present disclosure that exhibits a low-density can comprise, for example, low-density filler such as low-density organic filler, hollow microspheres, coated microspheres, or combinations of any of the foregoing.

A layer of a multilayer system provided by the present disclosure that exhibits corrosion resistance can comprise, for example, one or more corrosion inhibitors.

A layer of a multilayer system provided by the present disclosure that exhibits corrosion resistance can comprise, for example, one or more inorganic filler.

When cured, a multilayer system provided by the present disclosure can exhibit, for example, one or more of a desired solvent resistance, low-temperature flexibility, hydrolytic stability, high temperature resistance, high tensile/elongation, bonding to the substrate, bonding to a primer coating, adhesion to an adjoining layer, fast tack-free time, fast time to Shore 10A hardness, electrical conductivity, EMI/RFI shielding, static dissipation, corrosion resistance, sound damping, or a combination of any of the foregoing.

For example, following exposure to Jet Reference Fluid (JRF Type 1) according to ISO 1817 for 168 hours at 60° C., a cured multilayer provided by the present disclosure system provided by the present disclosure can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Following exposure to de-icing fluid according to ISO 11075 Type 1 for 168 hours at 60° C., a cured multilayer system provided by the present disclosure can exhibit a tensile strength greater than 1 MPa determined according to ISO 37, and a tensile elongation greater than 150% determined according to ISO 37, where the tests are performed at a temperature of 23° C., and a humidity of 55% RH.

A chemically resistant multilayer system provided by the present disclosure can exhibit a % swell less than 25%, less than 20%, less than 15%, or less than 10%, following immersion in a chemical for 7 days at 70° C., where % swell is determined according to EN ISO 10563.

A multilayer t system provided by the present disclosure that exhibits low % swell can comprise, for example, a high cross-linking density. The % swell can be determined by immersion a cured composition in a particular solvent for 7 days at a 70° C. according to EN ISO 10563.

A multilayer system provided by the present disclosure can exhibit, for example, an as-cured tensile strength of at least 1 MPa as determined according to ISO 37 at 23° C./55% RH.

A multilayer system provided by the present disclosure can exhibit, for example, an as-cured % elongation of at least 150% as determined according to ISO 37 at 23° C./55% RH.

A multilayer system provided by the present disclosure can exhibit a fast time to a hardness of Shore 10A of less than 10 minutes where hardness is determined according to ISO 868 at 23° C./55% RH.

An electrically conductive multilayer system or a layer of a multilayer system provided by the present disclosure can exhibit a surface resistivity, for example, less than $10^6$ Ohm/square, less than $10^5$ Ohm/square, less than $10^4$ Ohm/square, less than $10^3$ Ohm/square, less than $10^2$ Ohm/square, less than 10 Ohm/square, less than $10^{-1}$ Ohm/square, or less than $10^{-2}$ Ohm/square. A surface of an electrically conductive multilayer system or a layer of a multilayer system provided by the present disclosure can have a surface resistivity, for example, from $10^{-2}$ to $10^2$, from $10^2$ Ohm/square to $10^6$ Ohm/square, or from $10^3$ Ohm/square to $10^5$ Ohm/square. Surface resistivity can be determined according to ASTM D257 at 23° C./55% RH.

A multilayer system or a layer of a multilayer system provided by the present disclosure can have a volume resistivity, for example, less than $10^6$ Ohm/cm, less than $10^5$ Ohm/cm, less than $10^4$ Ohm/cm, less than $10^3$ Ohm/cm, less than $10^2$ Ohm/cm, less than 10 Ohm/cm, less than $10^{-1}$ Ohm/cm, or less than $10^{-2}$ Ohm/cm. An electrically conductive multilayer system or a layer of a multilayers system can have a volume resistivity, for example, from $10^{-2}$ Ohm/cm to $10^1$ Ohm/cm, from $10^2$ Ohm/cm to $10^6$ Ohm/cm, or from $10^3$ Ohm/cm to $10^5$ Ohm/cm. Volume resistivity can be determined according to ASTM D257 at 23° C./55% RH.

A multilayer system or a layer of a multilayer system provided by the present disclosure can have an electrical conductivity, for example, greater than 1 S cm$^{-1}$, greater than 10 S cm$^{-1}$, greater than 100 S cm$^{-1}$, greater than 1,000 S cm$^{-1}$, or greater than 10,000 S cm$^{-1}$. An electrically conductive multilayer system can have an electrical conductivity from 1 S cm$^{-1}$ to 10,000 S cm$^{-1}$, from 10 S cm$^{-1}$ to 1,000 cm$^{-1}$ or from 10 S cm$^{-1}$ to 500 S cm$^{-1}$. Electrical conductivity is determined according to ASTM D257 at 23° C./55% RH.

A multilayer system or a layer of a multilayer system provided by the present disclosure can exhibit an attenuation at frequencies within a range from 10 KHz to 20 GHz, for example, of greater than 10 dB, greater than 30 dB, greater than 60 dB, greater than 90 dB, or greater than 120 dB. An electrically conductive multilayer system provided by the present disclosure can exhibit an attenuation at frequencies within a range from 10 KHz to 20 GHz, for example, of from 10 dB to 120 dB, from 20 dB to 100 dB, from 30 dB to 90 dB, or from 40 dB to 70 dB. Shielding effectiveness is determined according to ASTM D4935 at 23° C./55% RH.

A multilayer system or a layer of a multilayer system provided by the present disclosure exhibit a thermal conductivity from 0.1 to 50 W/(m-K), from 0.5 to 30 W/(m-K), from 1 to 30 W/(m-K), from 1 to 20 W/(m-K), from 1 to 10 W/(m-K), from 1 to 5 W/(m-K), from 2 to 25 W/(m-K), or from 5 to 25 W/(m-K). Thermal conductivity is determined according to ASTM D1461 at 23° C./55% RH.

A multilayer system or a layer of a multilayer system provided by the present disclosure can exhibit a specific gravity, for example, less than 1.1, less than 1.0, less than 0.9, less than 0.8, or less than 0.7, where specific gravity is determined according to ISO 2781 at 23° C./55% RH.

A multilayer system or a layer of a multilayer system provided by the present disclosure can exhibit a hardness, for example, greater than Shore 20A, greater than Shore 30A, greater than Shore 40A, greater than Shore 50A, or greater than Shore 60A, where hardness is determined according to ISO 868 at 23° C./55% RH.

A cured multilayer system can have properties acceptable for use in vehicle and aerospace sealant applications. In general, it is desirable that sealants used in aviation and aerospace applications exhibit the following properties: peel strength greater than 20 pounds per linear inch (ph) on Aerospace Material Specification (AMS) 3265B substrates determined under dry conditions, following immersion in JRF Type I for 7 days, and following immersion in an aqueous solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other properties appropriate for aviation and aerospace applications are disclosed in AMS 3265B. It is also desirable that, when cured, multilayer systems of the present disclosure used in aviation and aircraft applications exhibit a percent volume swell not greater than 25% following immersion for one week at 60° C. and ambient pressure in Jet Reference Fluid (JRF) Type I. Other properties, ranges, and/or thresholds may be appropriate for other sealant applications.

A multilayer system provided by the present disclosure can be fuel-resistant. The term "fuel resistant" can mean that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 60° C. and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989 § 3.1.1 etc., available from SAE (Society of Automotive Engineers)).

A chemically resistant multilayer system provided by the present disclosure can exhibit a tensile elongation of at least 200% and a tensile strength of at least 200 psi when measured in accordance with the procedure described in AMS 3279 § 3.3.17.1, test procedure AS5127/1 § 7.7.

A multilayer system provided by the present disclosure can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A multilayer system provided by the present disclosure can meet or exceed the requirements for aerospace sealants as set forth in AMS 3277.

A layer of a multilayer system provided by the present disclosure that imparts sound damping properties can comprise an epoxy-containing compound where the epoxy-containing compound comprises an epoxy/polyol adduct, a polythiol, and a curing agent.

A multilayer system provided by the present disclosure can impart sound damping properties to a structure. For example, when a multilayer system having sound damping properties is applied to a substrate, the substrate can exhibit a sound damping loss factor of at least 0.06 at 800 Hz, at least 0.04 at 400 Hz, or at least 0.02 at 200 Hz at 10° C., 2.5 mm sealant thickness measured according to SAE test method J1637 and ASTM E756 on 240 mm long, 10 mm wide, and 1 mm thick steel panels coated along 215 mm of the length.

A multilayer system can comprise one or more coatings. A coating can be provided on the exterior surface of the inner layer of the multilayer system, on the exterior surface of the outer layer of the multilayer system, and/or between one or more layers of the multilayer system. A coating refers to a layer that has a thickness less than that of a layer of the multilayer system.

Figure 3:
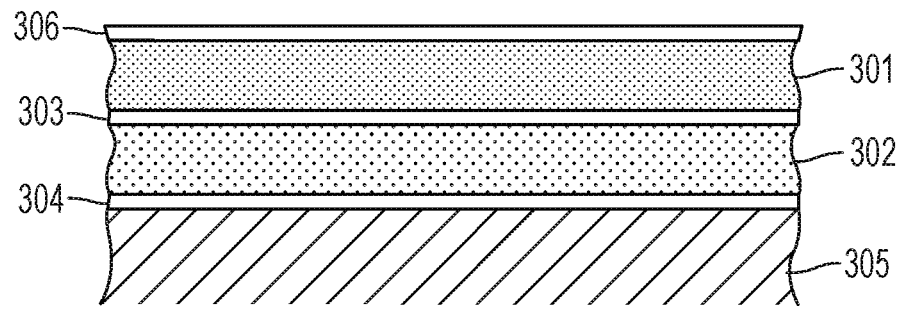
FIG. 3 shows a cross-sectional view of a multilayer system provided by the present disclosure that includes a coating.

A multilayer system provided by the present disclosure can comprise an intermediate coating between the layers, an interior coating, an exterior coating, or a combination of any of the foregoing. An intermediate coating refers to a coating between adjoining layers; an interior coating refers to a coating that that is adjacent a surface; and an exterior coating is on the outside surface of the multilayer system. Examples of coatings are shown in FIG. 3. FIG. 3 shows a cross sectional view of a multilayer system having a first layer 302 overlying a substrate 305, and a second layer 301 overlying the first layer 302. A first coating 304 is disposed between the first layer 302 and the substrate 305 to enhance, for example, adhesion and/or corrosion resistance. A second coating 303 is disposed between the first and second layers 301/302 to enhance, for example, interlayer adhesion. A third coating 306 can overly the outer surface of the multilayer system and can be configured to enhance, for example, chemical resistance, abrasion resistance, or electrical conductivity of one or more layers of a multilayer system An intermediate, interior or exterior coating can have a thickness, for example, from 0.001 to 2 mm, from 0.01 mm to 1 mm, from 0.05 mm to 0.5 mm, or from 0.1 mm to 0.4 mm. A coating can have a thickness, for example, less than 2 mm, less than 1 mm, less than 0.5 mm, less than 0.1 mm, or less than 0.05 mm. The thickness of the coating can be less than the thickness of the layers forming the multilayer system. An intermediate coating can be used to enhance or to provide certain desired properties to the multilayer system such as, for example, interlayer adhesion, electrical conductivity, EMI/RFI shielding, or a combination of any of the foregoing.

An intermediate coating can comprise compounds comprising functional groups reactive with the reactive compounds of the underlying and/or overlying layers. For example, when the overlying and/or underlying layers comprise coreactive compounds having thiol functional groups, an intermediate coating layer can comprise compounds having groups reactive with thiol groups such as alkenyl groups, alkynyl groups, isocyanate groups, thiol groups or epoxy groups.

An interior coating can provide adhesion to a substrate, provide corrosion resistance, or a combination thereof. For example, an interior coating can comprise, for example, adhesion promoters, corrosion inhibitors, partially hydrolyzed/condensed organo-functional alkoxysilanes, and combinations of any of the foregoing.

An exterior coating can be configured to provide aesthetics, static dissipation, electrical conductivity, EMI/RFI shielding, or a combination of any of the foregoing. For example, an exterior coating can comprise, for example, a colorant, electrically conductive filler, or a combination thereof.

A multilayer system can include an exterior coating such as a clear coat, an abrasion-resistant coating, a color coating, a textured coating, a solvent resistant coating, a UV-protective coating, a haptic, or a combination of any of the foregoing, overlying the multilayer system. The surface coatings can be used to impart a desired surface property such as, for example, electrical conductivity, reflectivity such as IR reflectivity, color, wavelength-dependent absorption, wavelength-dependent reflectivity, scratch resistance, abrasion resistance, stain resistance, fingerprint resistance, resistance to cleaning fluids, impart aesthetic qualities, and/or impart tactile properties. The coating can comprise a multilayer coating. A coating can be a haptic coating such as a soft-touch coating. The coating can be applied to an extrudate using an extrusion coating die.

A multilayer system provided by the present disclosure can be prepared by depositing an extrudate comprising a coreactive sealant composition or a coextrudate comprising a coreactive sealant composition and one or more additional coreactive compositions onto a substrate.

A multilayer system can be applied using additive manufacturing methods. Additive manufacturing is broadly used to encompass robotic manufacturing methods. Additive manufacturing includes, for example, three-dimensional printing, extrusion, and coextrusion.

Using additive manufacturing methods, a multilayer system comprising individual layers of coreactive compositions can be applied directly to a substrate and subsequently cured and/or allowed to cure to provide a cured multilayer system.

A multilayer system can be applied by coextrusion. Coextrusion is broadly used to refer to methods in which a multilayer system is applied to a substrate using pressure. Pressure can be applied manually or automatically. Co-extrusion includes processes involving extrusion through a coextrusion die or merging parallel flows of coreactive compositions.

Coextrusion facilitates the ability of a multilayer system to be applied to a substrate in a single process. By simultaneously applying the layers of a multilayer system, the ability to maintain the consistency, the reproducibility, and the integrity of the multilayer system can be facilitated.

A first and second coreactive composition can be coextruded through a coextrusion die having a suitable shape to provide a coextrudate.

Figure 4:
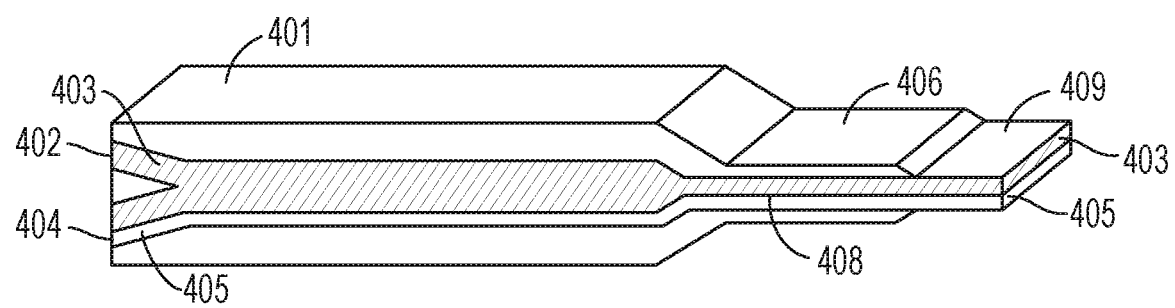
FIG. 4 shows a cross-sectional view of an example of a coextruder.

A schematic of an example of a coextruder is shown in FIG. 4. The coextruder includes a barrel 401, a first inlet 402 for a first coreactive composition 403, a second inlet 404 for a second coreactive composition 405, and an exit nozzle 406. The inlets can be coupled to pumps that control the flow of the coreactive compositions into the coextruder. The coextruder barrel can comprise sensors coupled to the pumps to control the flow of the coreactive compositions into the extruder barrel. The flow of the coreactive compositions can be controlled such that the flows merge but do not mix. At the exit nozzle 406 the merged coreactive compositions 408 can be shaped to provide a coextrudate 409. As shown in FIG. 4 the coextrudate is in the form of a sheet in which the first coreactive composition 403 overlies the second coreactive composition 405. The coextrudate can be applied to a part or surface to be sealed.

A coextruder can comprise pressure controls, extrusion dies, coextrusion dies, coating applicators, temperature control elements, elements for irradiating a coreactive sealant composition, or combinations of any of the foregoing.

For automated manufacturing, the coextruder can be mounted on an apparatus for moving a nozzle with respect to a surface. The automated manufacturing apparatus including the coextruder can be controlled by a processor.

Co-extrusion methods are sufficiently versatile that a wide range of co-extrudate structures can be fabricated.

For example, for a three-dimensional multilayer system, the coextrusion can have a core-shell configuration comprising an inner layer comprising a first composition and an outer layer comprising a second composition. The core-shell coextrusion can be applied directly over a three-dimensional surface as a single unit.

For a two-dimensional multilayer system, the coextrusion can be in the shape of a sheet having two or more overlying layers. A surface can be sealed by applying successive sheets of the multilayer system adjacent to a previously deposited sheet of the multilayer system.

A multilayer system can be fabricated as a separate component that can subsequently be applied to a surface to be sealed. For example, a multilayer system can be fabricated as a sheet or a preform having a desired shape and partially cured or fully cured. The partially cured or fully cured multilayer system component can then be applied to a surface.

A multilayer system can be applied directly to a surface to be sealed. For example, individual layers of a multilayer system can be sequentially be applied to a surface where one or more of the layers is applied using the coreactive three-dimensional printing methods provided by the present disclosure. A multilayer system provided by the present disclosure can be coextruded directly onto a surface to be sealed.

As a consequence of having multiple layers, there can be interfaces between each of the layers of a multilayer system. The integrity of the layer interfaces can be maintained in view of the overall performance requirement of the multilayer system.

Interlayer adhesion between adjoining layers of a multilayer system can be enhanced in several ways. For example, an adhesion-promoting coating can be applied between the adjoining layers. An adhesion-promoting coating can include adhesion promoters and/or reactive groups capable of non-covalently bonding or covalently bonding to one or more constituents of the adjoining layers.

Adhesion between adjoining strips of a multilayer system can be enhanced by facilitating the ability of adjoining layers to chemically and/or physically bond. This can be accomplished, for example, by including coreactive compositions in adjoining strips of the multilayer system having reactive compounds that can chemically react with compounds in an adjoining coreactive composition. For example, for layers based on thiol-ene chemistry, an adhesion-promoting interlayer coating can include compounds having unreacted groups capable of reacting with the thiol and/or the alkenyl groups of the overlying and underlying layers.

The rate of interlayer crosslinking between adjoining layers of a multilayer system can be controlled to facilitate interlayer reaction and thereby improve the interlayer strength. For example, it can be desirable that adjoining layers be chemically bond to each other. To accomplish this, a second layer can be deposited onto a first layer before the first layer is fully cured such that the first layer has unreacted functional groups capable of reacting with functional groups of the second layer. The rate of interlayer crosslinking can be controlled, for example, by adjusting the time between deposition of successive layers, adjusting the temperature, adjusting the concentration of a catalyst, and/or adjusting the components of the composition such as the amount of monomer and prepolymer.

A layer may be homogeneous, or a layer may be inhomogeneous. For an inhomogeneous layer, a cross-section of the layer may have different chemical compositions across the profile. For example, to improve interlayer adhesion, a portion of a layer may have an excess of a certain coreactive functionality that can then react with an excess of a coreactive functionality of an overlying layer. Similarly, to improve interlayer adhesion, a lower portion of a layer may have an excess of a certain coreactive functionality that can then react with an excess of a coreactive functionality of an underlying layer. To improve interlayer bonding and/or adhesion, a tie coating, film, or other treatment may be applied or deposited over a deposited layer prior to or during deposition of an overlying layer. The interlayer tie layer can include, for example, compounds reactive with the adjoining layers, catalysts, and/or adhesion promoters. An interlayer tie coat can be applied to a surface of the extrudate by coextrusion.

A layer can be applied to at least a portion of a surface of a coreactive composition and/or coextrudate. A layer can be applied, for example, by passing a coextrudate through a liquid composition to provide a coating on the exterior surface or a portion of the exterior surface of the coextrudate. The coating can comprise materials that enhance adhesion between adjoining strips of the multilayer system. For example, a thin film coating can comprise compounds having groups reactive with functional groups of coreactive compositions forming the multilayer system.

Coextruded multilayer systems can also be configured to facilitate adhesion to multiple substrates. For example, an adhesion package can be optimized for bonding the inner layer of a multilayer system to a particular substrate. However, the adhesion package may not be optimal for facilitating bonding to a different substrate. For example, different adhesion packages can be optimized for bonding to different metals such as aluminum and titanium, or to composites and to metals. An innermost layer of a multilayer system can include two or more portions having a different adhesion packages, and the other constituents of the coreactive composition forming the inner layer can be substantially the same or different. In this way, bonding of a multilayer system to a substrate comprising different materials can be enhanced.

An extrudate or coextrudate can be deposited in any orientation. For example, the nozzle can be directed downwards, upwards, sideways, or at any angle in between. In this way a multilayer system can be deposited as a vertical wall or as an overhang. An extrudate or coextrudate can be deposited on a vertical wall, the lower surface of a tilted wall, or on the bottom of a horizontal surface. The use of an extrudate or coextrudate with a fast curing chemistry can facilitate the ability of an overlying layer to be deposited adjoining an underlying layer such that an angled surface can be fabricated. The be angled surface can be angled upward with respect to horizontal or downward with respect to horizontal.

A coreactive composition can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL/min. The volume flow rate can depend, for example, on the viscosity of a coreactive composition, the extrusion pressure, the nozzle diameter, and the reaction rate of the coreactive compounds.

A coreactive composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The print speed can depend, for example, on the viscosity of the coreactive composition, the extrusion pressure, the nozzle diameter, and the reaction rate of the coreactive components. The print speed refers to the speed at which a nozzle used to extrude a coreactive composition moves with respect to a surface onto which the coreactive composition is being deposited.

A multilayer system comprising a sealant layer provided by the present disclosure can be used in any application where a sealant is used to protect a surface from a use environment. A multilayer can be used, for example, to seal parts and surfaces of automotive vehicles and aerospace vehicles.

A multilayer system can be applied directly onto or deposited onto the surface of a substrate or over a coating such as a primer coating or an adhesion-promoting coating.

A multilayer system provided by the present disclosure can be applied to or deposited onto any of a variety of substrates. Examples of substrates to which a multilayer system can be applied include metals such as titanium, stainless steel, steel alloy, aluminum, and aluminum alloy, any of which may be anodized, primed, organic-coated or chromate-coated; or can include epoxy, urethane, graphite, fiberglass composite, Kevlar®, acrylics, polycarbonates, and combinations of any of the foregoing.

A cured multilayer system provided by the present disclosure can exhibit properties acceptable for use in vehicle applications such as automotive and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured properties of a multilayer system appropriate for aviation and aerospace applications are disclosed in AMS 3265B. It is also desirable that, when cured, a multilayer system used in aviation and aircraft applications exhibit a percent volume swell not greater than 25% following immersion for one week at 60° C. and ambient pressure in Jet Reference Fluid (JRF) Type 1. Other properties, ranges, and/or thresholds may be appropriate for other sealant applications such as automotive applications.

A multilayer system provided by the present disclosure can exhibit a tensile elongation of at least 200% and a tensile strength of at least 200 psi when measured in accordance with the procedure described in AMS 3279, § 3.3.17.1, test procedure AS5127/1, § 7.7.

A multilayer system provided by the present disclosure can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A multilayer system prepared using methods provided by the present disclosure can meet or exceed the requirements for aerospace sealants as set forth in AMS 3277.

Prior to environmental exposure a multilayer system provided by the present disclosure exhibit a density less than 1.2 g/cm$^3$ (specific gravity less than 1.2) as determined according to ISO 2781, a tensile strength greater than 1 MPa determined according to ISO 37, a tensile elongation greater than 150% determined according to ISO 37, and a hardness greater than 40 Shore A determined according to ISO 868, where the tests are performed at a temperature within a range of 21° C. to 25° C., and a humidity from 45% RH to 55% RH.

Following exposure to aviation fuel (JRF Type 1) according to ISO 1817 for 168 hours at 60° C., a multilayer system can exhibit a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to 3% aqueous NaCl for 168 hours at 60° C., a multilayer system can exhibit a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to de-icing fluid according to ISO 11075 Type 1 for 168 hours at 60° C., a multilayer system provided by the present disclosure can exhibit a tensile strength greater than 1 MPa determined according to ISO 37, and a tensile elongation greater than 150% determined according to ISO 37, where the tests are performed at a temperature within a range of 21° C. to 25° C., and a humidity from 45% RH to 55% RH.

Following exposure to phosphate ester hydraulic fluid (Skydrol® LD-4) for 1,000 hours at 70° C., a multilayer system provided by the present disclosure can exhibit a tensile strength greater than 1 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

A multilayer system provided by the present disclosure can have a glass transition temperature, for example, of less than –10° C., less than –20° C., less than –30° C., less than –40° C., less than –50° C., or less than –60° C.

Methods of making multilayer systems and multilayer systems made using the methods can be used to seal any suitable part such as, for example, a part or surface of a vehicle.

The term "vehicle" is used in its broadest sense and includes all types of aerospace vehicles, watercraft, and ground vehicles. For example, a vehicle can include, aerospace vehicles such as airplanes including private aircraft, and small, medium, or large commercial passenger, freight, and military aircraft; helicopters, including private, commercial, and military helicopters; rockets and spacecraft. A vehicle can include a ground vehicle such as, for example, automobiles, trailers, trucks, buses, vans, construction vehicles, golf carts, motorcycles, bicycles, trains, and railroad cars. A vehicle can also include watercraft such as, for example, ships, boats, and hovercraft.

A multilayer system can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). A multilayer system can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Multilayer systems provided by the present disclosure can be used to seal parts and surfaces of vehicles such as fuel tank surfaces and other surfaces exposed to or potentially exposed to solvents, hydraulic fluids, lubricants, oils, and fuels.

The present invention includes parts sealed with a multilayer system provided by the present disclosure, and assemblies and apparatus comprising a part sealed with a multilayer system provided by the present disclosure. Apertures, surfaces, joints, fillets, fay surfaces including apertures, surfaces, fillets, joints, and fay surfaces of vehicles, sealed with the multilayer system are included within the scope of the invention. Parts, such as vehicle parts, including automotive vehicle parts and aerospace vehicle parts sealed using methods provided by the present disclosure are included within the scope of the invention.

The present invention includes vehicles comprising a part such as a surface sealed with a multilayer system provided by the present disclosure. For example, an aircraft comprising a fuel tank or portion of a fuel tank sealed with a multilayer system is included within the scope of the invention. Vehicles such as automotive vehicles and aerospace vehicles sealed comprising parts sealed using methods provided by the present disclosure are included within the scope of the invention.

A multilayer system provided by the present disclosure can be used to seal fasteners. A fastener can be a fastener on the surface of a vehicle including, for example, motor vehicles, automobiles, trucks, buses, vans, motorcycles, scooters, recreational motor vehicles; railed vehicles trains, trams, bicycles, aerospace vehicles, airplanes, rockets, spacecraft, jets, helicopters, military vehicles including jeeps, transports, combat support vehicles, personnel carriers, infantry fighting vehicles, mine-protected vehicles, light armored vehicles, light utility vehicles, military trucks, watercraft including ships, boats, and recreational watercraft. Fasteners sealed using a multilayer system provided by the present disclosure are included within the scope of the invention.

Aspects of the Invention

The invention can be further defined by one or more of the following aspects.

Aspect 1. A method of making a multilayer system comprising two or more layers, wherein one or more of the layers comprises a sealant layer, comprising: (a) mixing a first component and a second component to form a coreactive sealant composition, wherein, the coreactive sealant composition comprises a first reactive compound and a second reactive compound; and the first reactive compound is reactive with the second reactive compound; (b) extruding the coreactive sealant composition to form an extrudate; and (c) depositing the extrudate to form the sealant layer.

Aspect 2. The method of aspect 1, wherein depositing comprises three-dimensional printing.

Aspect 3. The method of any one of aspects 1 to 2, wherein depositing comprises depositing the extrudate onto an underlying layer of the multilayer system.

Aspect 4. The method of any one of aspects 1 to 3, further comprising: depositing a first coreactive composition underlying the deposited sealant layer to form an underlying layer; and/or depositing a second coreactive composition overlying the sealant layer to form an overlying layer, wherein the first coreactive composition and the second coreactive composition comprise a different composition than the sealant layer.

Aspect 5. The method of aspect 4, wherein the first coreactive composition is different than the second coreactive composition.

Aspect 6. The method of any one of aspects 1 to 5, wherein any of the coreactive sealant compositions comprise a thermosetting composition.

Aspect 7. The method of any one of aspects 1 to 6, wherein each of the layers of the multilayer system comprises a thermoset.

Aspect 8. The method of any one of aspects 1 to 7, wherein a cross-sectional profile of the extrudate has a homogeneous composition across the cross-sectional profile.

Aspect 9. The method of any one of aspects 1 to 7, wherein a cross-sectional profile of the extrudate has an inhomogeneous composition across the cross-sectional profile.

Aspect 10. The method of any one of aspects 1 to 9, wherein an outermost layer of the two or more layers of the multilayer system comprises a sealant layer.

Aspect 11. The method of any one of aspects 1 to 10, wherein each of the layers of the multilayer system independently comprises a sealant layer or a non-sealant layer.

Aspect 12. The method of any one of aspects 1 to 11, wherein the coreactive sealant composition comprises a prepolymer comprising a chemically resistant backbone.

Aspect 13. The method of any one of aspects 1 to 12, wherein the coreactive sealant composition comprises a sulfur content greater than 10 wt %, wherein wt % is based on the total weight of the organic constituents of the coreactive sealant composition.

Aspect 14. The method of any one of aspects 1 to 13, wherein the coreactive sealant composition comprises a sulfur-containing prepolymer.

Aspect 15. The method of aspect 14, wherein the sulfur-containing prepolymer comprises a polythioether, a polysulfide, a sulfur-containing polyformal, a monosulfide, or a combination of any of the foregoing.

Aspect 16. The method of any one of aspects 14 to 15, wherein the sulfur-containing prepolymer comprises a sulfur content greater than 10 wt %. wherein wt % is based on the total weight of the sulfur-containing prepolymer.

Aspect 17. The method of any one of aspects 1 to 16, wherein the first reactive compound is reactive with the second reactive compound at a temperature less than 50° C.

Aspect 18. The method of any one of aspects 1 to 17, wherein, the first reactive compound is reactive with the second reactive compound in the presence of a catalyst and/or a polymerization initiator; and the catalyst and/or polymerization initiator is capable of catalyzing and/or initiating a reaction between the first reactive compound and the second reactive compound.

Aspect 19. The method of any one of aspect 18, further comprising activating the polymerization initiator before depositing, during deposition, and/or after depositing the extrudate.

Aspect 20. The method of any one of aspects 1 to 19, wherein, the first component comprises the first reactive compound and the second reactive compound; and the second component comprises a catalyst, a cure activator, and/or a polymerization initiator for the reaction between the first reactive compound and the second reactive compound.

Aspect 21. The method of any one of aspects 1 to 19, wherein the first component comprises the first reactive compound and the second component comprises the second reactive compound.

Aspect 22. The method of any one of aspects 1 to 21, wherein, the first reactive compound comprises a polyamine and/or a polyol and the second reactive compound comprises a polyisocyanate; the first reactive compound comprises a polyamine and the second reactive compounds comprises a polyepoxide; the first reactive compound comprises a Michael acceptor and the second reactive compound comprises a Michael donor; or the first reactive compound comprises a polythiol and the second reactive compound comprises a polythiol, a polyisocyanate, a polyalkenyl, a polyalkynyl, a polyepoxide, a Michael acceptor, or a combination of any of the foregoing.

Aspect 23. The method of any one of aspects 1 to 22, further comprising: pumping the first component into a mixer using a first pump; and pumping the second component into the mixer using a second pump.

Aspect 24. The method of any one of aspects 1 to 23, further comprising, after depositing the extrudate, curing the deposited extrudate.

Aspect 25. The method of aspect 24, wherein curing comprises allowing the deposited extrudate to cure at a temperature less than 30° C.

Aspect 26. The method of any one of aspects 1 to 25, further comprising merging one or more additional coreactive compositions with the coreactive sealant composition, wherein extruding comprises coextruding the coreactive sealant composition and the one or more additional coreactive compositions to form a coextrudate; and depositing comprises depositing the coextrudate to form a multilayer system comprising one or more sealant layers.

Aspect 27. The method of aspect 26, wherein each of the one or more additional coreactive compositions independently comprises an additional coreactive sealant composition or a coreactive non-sealant composition.

Aspect 28. The method of any one of aspects 26 to 27, wherein the coreactive sealant composition and an adjoining additional coreactive composition comprise the same curing chemistry.

Aspect 29. The method of any one of aspects 26 to 28, wherein the coreactive sealant composition and an adjoining additional coreactive composition comprise different curing chemistries.

Aspect 30. The method of any one of aspects 26 to 29, wherein the coreactive sealant composition is reactive with an adjoining additional coreactive composition.

Aspect 31. The method of any one of aspects 26 to 30, further comprising: combining an additive-containing composition with a portion of an additional coreactive composition to form an additive-modified additional coreactive composition, wherein the additive-containing composition comprises an additive; and extruding comprises coextruding the coreactive sealant composition and the additive-modified additional coreactive composition to form a coextrudate.

Aspect 32. The method of aspect 31, wherein a cross-sectional profile of the coextrudate has an inhomogeneous concentration of the additive.

Aspect 33. The method of any one of aspects 31 to 32, wherein the extrudate is characterized by an inhomogeneous concentration of the additive within a longitudinal dimension of the coextrudate.

Aspect 34. The method of any one of aspects 26 to 33, further comprising mixing a third component with a fourth component to form the one or more additional coreactive compositions.

Aspect 35. The method of any one of aspects 1 to 34, further comprising: combining an additive-containing composition with a portion of the coreactive sealant composition to form an additive-modified coreactive sealant composition, wherein the additive-containing composition comprises an additive; and extruding the additive-modified coreactive sealant composition to form the extrudate.

Aspect 36. The method of aspect 35, wherein a cross-sectional profile of the extrudate has an inhomogeneous concentration of the additive.

Aspect 37. The method of any one of aspects 35 to 36, wherein the extrudate is characterized by an inhomogeneous concentration of the additive within a longitudinal dimension of the extrudate.

Aspect 38. The method of any one of aspects 1 to 37, further comprising merging an adhesion-promoting composition with the coreactive sealant composition; and extruding comprises coextruding the first coreactive composition and the adhesion-promoting composition.

Aspect 39. The method of any one of aspects 1 to 38, further comprising applying an adhesion-promoting layer to the extrudate before depositing the extrudate.

Aspect 40. A multilayer system comprising a sealant layer made by the method of any one of aspects 1 to 39.

Aspect 41. The multilayer system of aspect 40, wherein adjoining layers are chemically and/or physically bound.

Aspect 42. The multilayer system of any one of aspects 40 to 41, wherein a fracture energy of the fully cured multilayer sealant is substantially the same as the fracture energy of an individual layer, wherein the fracture energy is determined according to ASTM D7313.

Aspect 43. The multilayer system of any one of aspects 40 to 42, wherein each of the layers comprises a thermoset material.

Aspect 44. The multilayer system of any one of aspects 40 to 43, wherein each of the layers comprises a different thermoset material.

Aspect 45. The multilayer system of any one of aspects 40 to 44, wherein the multilayer system meets or exceeds the requirements for aerospace sealants as set forth in AMS 3277.

Aspect 46. The multilayer system of any one of aspects 40 to 45, wherein one or more of the layers of the multilayer sealant has an inhomogeneous composition cross-sectional profile.

Aspect 47. The multilayer system of any one of aspects 40 to 46, wherein one or more of the layers of the multilayer sealant has an inhomogeneous composition in the longitudinal dimension.

Aspect 48. A part comprising the multilayer system of any one of aspects 40 to 47.

Aspect 49. The part of aspect 48, wherein the part comprises an automotive vehicle part or an aerospace vehicle part.

Aspect 50. A vehicle comprising the multilayer system of any one of aspects 40 to 47.

Aspect 51. The vehicle of aspect 50, wherein the vehicle comprises an aerospace vehicle or an automotive vehicle.

EXAMPLES

Embodiments provided by the present disclosure are further illustrated by reference to the following examples, which describe methods of making multilayer systems and properties of the multilayer systems. It will be apparent to those skilled in the art that many modifications, both to materials, and methods, may be practiced without departing from the scope of the disclosure.

Example 1

Synthesis of Thiol-Terminated Polyepoxy-Extended Copolymer

A thiol-terminated polythioether polymer, Permapol® P3.1E, (384.32 g, commercially available from PPG Aerospace, mercaptan equivalent weight 1650) and a polyepoxide, DEN® 431 (8.45 g, available from the Dow Chemical) were combined in a plastic cup. The components were combined using a mixer (Hauschild Speed Mixer, 2,300 rpm, 45 sec). An amine, Dabco® 33-LV, (5.38 g, available from Air Products & Chemicals) was added to the mixture and combined using a high-speed mixer (Hauschild Speed-Mixer®, 30 sec at 2,300 rpm and 5 min at 800 rpm). The resulting thiol-terminated polyepoxy-extended polythioether prepolymer was then left at 23° C. for 24 h before combining with other constituents to prepare a coreactive sealant composition. The thiol-terminated polyepoxy-extended polythioether prepolymer had a number average molecular weight of 4,716 Da, and a thiol equivalent weight of 2,069 Da.

Example 2

Preparation of Skydrol®-Resistant Polythioether Sealant

A Base coreactive component (Part B) comprising the thiol-terminated polyepoxy-extended polythioether prepolymer of Example 1 was prepared. The constituents shown in Table 1 were combined and mixed to form the Base component (Part B).

TABLE 1

Base coreactive component (Part B).

| Constituent | Material | Amount (wt %) |
|---|---|---|
| Thiol-terminated chain-extended prepolymer | Thiol-terminated polyepoxy-extended polythioether prepolymer of Example 1 | 61.62 |
| Organic filler | Micronized polyolefin, ACumist ® A-6 [1] | 6.08 |
| Organic filler | Ganzpearl ® [2] | 24.65 |
| Inorganic filler | Calcium carbonate, Socal ® 31 [3] | 2.50 |
| Inorganic filler | Fumed silica, Aerosil ® R202 [4] | 3.08 |
| Adhesion promoter | Cooked Phenolic, T-3920 [5] | 0.42 |
| Adhesion promoter | Cooked Phenolic, T-3921 [5] | 0.33 |
| Adhesion promoter | Silquest ® A-1110 Alkoxysilane [6] | 0.5 |
| Adhesion promoter | Phenolic resin, Methylon ® 75108 [7] | 0.83 |

[1] Commercially available from Honeywell, Morris Plains, NJ.
[2] Commercially available from Sakai Trading, New York, NY.
[3] Commercially available from Solvay.
[4] Commercially available from Cabot Corp.
[5] Commercially available from PPG Aerospace, Sylmar, CA.
[6] Commercially available from Momentive.
[7] Commercially available Durez Corp.

An Accelerator component (Part A) comprising a polyepoxide curing agent was prepared. The constituents of the Accelerator component (Part A) are shown in Table 2.

TABLE 2

Accelerator (Part A) composition.

| Constituents | Material | Amount (wt %) |
|---|---|---|
| Polyepoxide | DER ® 331 [1] | 21.42 |
| Polyepoxide | EPU-73B [2] | 7.14 |
| Polyepoxide | Epoxy-terminated polythioether [3] | 21.91 |
| Polyepoxide | Epoxy novolac DEN ® 431 [4] | 9.09 |
| Inorganic filler | Calcium carbonate, Winnodil ® SPM [5] | 40.37 |
| Pigment | Sunfast ® Blue dye [6] | 0.07 |

[1] Commercially available from the Dow Chemical.
[2] Polyurethane polyepoxide; epoxy eq. wt. 245; commercially available from Adeka Corporation, Tokyo, Japan.
[3] Difunctional epoxy-terminated polythioether; epoxy eq. wt. 584; commercially available from PPG Aerospace, Sylmar, CA.
[4] Commercially available from the Dow Chemical.
[5] Commercially available from Solvay.
[6] Commercially available from Sun Chemical Corp.

A Skydrol® LD-4-resistant coreactive sealant composition was prepared by mixing 100 parts of the Base component (Part B) with 15.3 parts of the Accelerator component (Part A).

Example 3

Multilayer System

A multilayer system was made by first preparing a first inner layer comprising a sealant and then applying a second, outer layer over the first inner layer. The material used to prepare the first inner layer was not Skydrol® LD-4-resistant.

An inner layer was prepared by cutting samples of cured PR-2001 or PR-1776M sealant into 2-inch×2-inch×0.25-inch blocks. Both PR-2001 and PR-1776M are commercially available from PPG Aerospace. PR-2001 is a Class B two-part, epoxy-cured Permapol® 3.1 thiol-terminated polythioether prepolymer-based sealant. PR-1776M is a Class B, two-part, manganese dioxide-cured Permapol® P-5 modified polysulfide-based sealant.

The blocks of inner sealant were then coated with a layer of the Skydrol-resistant-coreactive sealant composition of Example 2 having a variable thickness from 1 mm to 4 mm to provide an outer layer. The outer layer covered the top, bottom and sides of the blocks and was then cured.

The multilayer systems (Multilayer Systems 1-4) were immersed in Skydrol® LD-4 for from 1 day to 5 days at 70° C. and the Shore A hardness of the blocks was periodically measured.

Skydrol® LD-4 is a fire-resistant hydraulic fluid based on phosphate ester chemistry available from Eastman Chemical Company. Skydrol® LD-4 has a concentration of about 58.2 wt % tributyl phosphate, from about 20 wt % to 30 wt % dibutyl phenyl phosphate, from about 5 wt % to 10 wt % butyl diphenyl phosphate, less than about 10 wt % 2-ethylhexyl-7-oxabicyclo[4.1.0] heptane-3-carboxylate, and from about 1 wt % to 5 wt % 2,6-di-tert-butyl-p-cresol.

Hardness was determined according to ASTM D2240. The hardness of control sealants consisting of the PR-2001 (Sealant C1) or PR-1776M (Sealant C2) sealant blocks without the layer of the Skydrol®-resistant sealant of Example 2 was also measured at intervals during immersion in Skydrol® LD-4 at 70° C.

The results are shown in Table 3. The results demonstrate that a multilayer system comprising a sealant layer exhibited greater Skydrol® LD-4 resistance than a single-layer sealant.

TABLE 3

Multilayer system Shore A hardness following immersion in Skydrol ® LD-4 at 70° C.

| Multilayer | Inner Sealant | Thickness Second Layer (mm) | Shore A Hardness | | | | |
|---|---|---|---|---|---|---|---|
| | | | Initial | After Skydrol ® LD-4 Immersion at 70° C. | | | |
| | | | | 1 day | 2 days | 3 days | 5 days |
| 1 | PR-2001 | 1 | 64A | 43A | 37A | 33A | 32A |
| 2 | PR-1776M | 1 | 63A | 44A | 36A | 31A | 28A |
| 3 | PR-2001 | 4 | 64A | 42A | 37A | 36A | 33A |
| 4 | PR-1776M | 4 | 60A | 38A | 38A | 34A | 31A |
| C1 | PR-2001 | 0 | 56A | 34A | 26A | 26A | 25A |
| C2 | PR-1776M | 0 | 50A | 17A | 2A | too soft to measure | too soft to measure |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A method of making a multilayer system comprising two or more layers, wherein one or more of the layers comprises a sealant layer, comprising:
   (a) mixing a first component and a second component to form a first coreactive sealant composition, wherein,
      the coreactive sealant composition comprises a first reactive compound and a second reactive compound; and
      the first reactive compound is reactive with the second reactive compound;
   (b) extruding the first coreactive sealant composition to form an extrudate;
   (c) depositing the extrudate to form the sealant layer, and
   (d) depositing a second coreactive composition underlying the deposited sealant layer to form an underlying layer; and/or
      depositing a third coreactive composition overlying the sealant layer to form an overlying layer, wherein the second coreactive composition and the third coreactive composition comprise a different composition than the sealant layer,
      wherein depositing comprises three-dimensional printing co-extruding.

2. The method of claim 1, wherein the first coreactive composition is different than the second coreactive composition.

3. The method of claim 1, wherein each of the layers of the multilayer system comprises a thermoset.

4. The method of claim 1, wherein a cross-sectional profile of the extrudate has a homogeneous composition across the cross-sectional profile.

5. The method of claim 1, wherein a cross-sectional profile of the extrudate has an inhomogeneous composition across the cross-sectional profile.

6. The method of claim 1, wherein an outermost layer of the two or more layers of the multilayer system comprises a sealant layer.

7. The method of claim 1, wherein the coreactive sealant composition comprises a sulfur-containing prepolymer.

8. The method of claim 1, wherein the first reactive compound is reactive with the second reactive compound at a temperature less than 50° C.

9. The method of claim 1, further comprising merging one or more additional coreactive compositions with the coreactive sealant composition, wherein,
   extruding comprises coextruding the coreactive sealant composition and the one or more additional coreactive compositions to form a coextrudate; and
   depositing comprises depositing the coextrudate to form a multilayer system comprising one or more sealant layers.

10. The method of claim 9, wherein each of the coreactive sealant compositions is reactive with an adjoining coreactive composition.

11. The method of claim 1, further comprising:
   combining an additive-containing composition with a portion of the coreactive sealant composition to form an additive-modified coreactive sealant composition, wherein the additive-containing composition comprises an additive; and
   extruding the additive-modified coreactive sealant composition to form the extrudate,
   wherein a cross-sectional profile of the extrudate has an inhomogeneous concentration of the additive; and/or
   wherein the extrudate is characterized by an inhomogeneous concentration of the additive within a longitudinal dimension of the extrudate.

12. The method of claim 1,
   further comprising merging an adhesion-promoting composition with the coreactive sealant composition; and
   extruding comprises coextruding the first coreactive composition and the adhesion-promoting composition.

* * * * *